(12) United States Patent (10) Patent No.: US 9,822,220 B2
Liao (45) Date of Patent: Nov. 21, 2017

(54) ANTIFOULING SYSTEM COMPRISING SILICONE HYDROGEL

(71) Applicant: Momentive Performance Materials Inc., Waterford, NY (US)

(72) Inventor: Wen P. Liao, Clifton Park, NY (US)

(73) Assignee: MOMENTATIVE PERFORMANCE MATERIALS, INC., Waterford, NY (US)

( * ) Notice: Subject to any disclaimer, the term of this patent is extended or adjusted under 35 U.S.C. 154(b) by 0 days.

(21) Appl. No.: 14/768,138

(22) PCT Filed: Dec. 13, 2013

(86) PCT No.: PCT/US2013/075046
§ 371 (c)(1),
(2) Date: Aug. 14, 2015

(87) PCT Pub. No.: WO2014/126643
PCT Pub. Date: Aug. 21, 2014

(65) Prior Publication Data
US 2016/0083622 A1 Mar. 24, 2016

Related U.S. Application Data

(60) Provisional application No. 61/765,450, filed on Feb. 15, 2013.

(51) Int. Cl.
*C09D 183/04* (2006.01)
*C09D 183/06* (2006.01)
(Continued)

(52) U.S. Cl.
CPC ......... *C08G 77/08* (2013.01); *C08G 59/3281* (2013.01); *C08G 77/04* (2013.01);
(Continued)

(58) Field of Classification Search
None
See application file for complete search history.

(56) References Cited

U.S. PATENT DOCUMENTS

| | | |
|---|---|---|
| 3,438,930 A | 4/1969 | Beers |
| 4,978,704 A | 12/1990 | Perrin |

(Continued)

FOREIGN PATENT DOCUMENTS

| | | |
|---|---|---|
| EP | 0732373 | 1/1997 |
| EP | 1013727 A1 | 6/2000 |

(Continued)

OTHER PUBLICATIONS

Grunlan et al., "Thermoelectric Behavior of Fully Organic, Poly-(ethylene glycol) and Their Interaction with Cells" Polymer Preprints 2011, 52(2) 1031.

(Continued)

*Primary Examiner* — Peter A Salamon
(74) *Attorney, Agent, or Firm* — James C. Abruzzo; Mcdonald Hopkins LLC

(57) ABSTRACT

A multi-layer or single layer antifouling coating system. A multi-layer coating system comprises (a) a base coating for coating a substrate, and (b) an antifouling coating composition adapted to be disposed over the base coating, the antifouling coating composition comprising a functionalized polymer, and a curable polyether-containing silane of the Formula (1): $(R^1O)_a(R^1)_{(3-a)}Si-R^2-(Si(R^1)_2O)_p-Si(R^1)_2-R^2-O-(CH_2-CHR^1-O)_q-R^1$ (1) where a is 1-3; $R^1$ is H or alkyl radical from $C_1-C_{10}$; R2 is alkylene from $C_2-C_{10}$; p is 1-100; and q is 1-50. The base coating composition can comprise an epoxy modified adhesion promoter. Additionally, the anti-fouling coating composition can comprise an acetoxy, alkoxy, and/or ketoxime functional adhesion promoter.

28 Claims, 1 Drawing Sheet

(51) Int. Cl.
*C09D 183/08* (2006.01)
*C09D 183/12* (2006.01)
*C08G 77/46* (2006.01)
*C08G 77/08* (2006.01)
*C09D 5/16* (2006.01)
*C09D 163/00* (2006.01)
*C08G 77/04* (2006.01)
*C09J 183/04* (2006.01)
*C08G 59/32* (2006.01)
*C08G 77/14* (2006.01)
*C08G 77/26* (2006.01)
*C08K 5/544* (2006.01)

(52) U.S. Cl.
CPC ......... *C09D 5/1637* (2013.01); *C09D 5/1693* (2013.01); *C09D 163/00* (2013.01); *C09D 183/04* (2013.01); *C09D 183/06* (2013.01); *C09D 183/08* (2013.01); *C09D 183/12* (2013.01); *C09J 183/04* (2013.01); *C08G 77/14* (2013.01); *C08G 77/26* (2013.01); *C08G 77/46* (2013.01); *C08K 5/544* (2013.01); *Y10T 428/31511* (2015.04); *Y10T 428/31663* (2015.04)

(56) References Cited

U.S. PATENT DOCUMENTS

| | | | |
|---|---|---|---|
| 4,996,112 A | 2/1991 | Perrin et al. | |
| 5,691,019 A * | 11/1997 | Carroll | B05D 5/00 114/357 |
| 5,756,562 A | 5/1998 | Lucarelli | |
| 6,458,878 B1 | 10/2002 | Tsuboi et al. | |
| 6,723,376 B1 * | 4/2004 | Hamilton | C09D 5/1668 427/140 |
| 8,354,168 B2 | 1/2013 | Amidaiji | |
| 2005/0031793 A1 | 2/2005 | Moeller et al. | |
| 2005/0059789 A1* | 3/2005 | Sakamoto | C09D 5/1675 528/43 |
| 2009/0029043 A1 | 1/2009 | Rong et al. | |
| 2010/0129587 A1 | 5/2010 | Terauchi | |
| 2010/0151257 A1* | 6/2010 | Suzuki | B05D 7/16 428/447 |
| 2010/0183886 A1* | 7/2010 | Davies | C08G 77/388 428/447 |
| 2011/0070376 A1* | 3/2011 | Wales | A01N 63/00 427/414 |
| 2011/0111212 A1* | 5/2011 | Borovik | B05D 5/00 428/336 |
| 2011/0112221 A1 | 5/2011 | Lejeune et al. | |
| 2016/0083622 A1* | 3/2016 | Liao | C09D 5/1637 524/500 |

FOREIGN PATENT DOCUMENTS

| | | |
|---|---|---|
| EP | 1829943 A1 | 9/2007 |
| EP | 2172523 A1 | 4/2010 |
| JP | 2001328845 | 11/2001 |
| WO | 2013/000478 | 3/2013 |
| WO | 2013/107827 | 7/2013 |

OTHER PUBLICATIONS

Cruise et al., "Characterization of permeability and network structure of interfacially photopolymerized poly(ethylene glycol) diacrylate hydrogels" (Biomaterials 1998, 19, 1287-1294).

Murthy et al., "Protein-Resistant Silicones: Incorporation of Poly(ethylene odixe) via Siloxane Tethers" Biomacromolecules 2007, 8, 3244-3252.

Han et al., "Synthesis of Polymer Network Scaffolds from L-Lactide and Poly(ethylene glycol) and Their Interaction with Cells" (Macromolecules 1997, 30, 6077-6083.0).

ISA / US, International Search Report and Written Opinion for International Application No. PCT/US2013/075046, dated Apr. 21, 2014.

Murthy, R. et al., "Protein-Resistant Silicons: Incorporation of Poly (ethylene oxide) via Siloxane Tethers." Biomacromolecules. vol. 8. 2007. pp. 3244-3252.

Giese, M. et al., "Anti-Fouling Coatings Prepared with Amphiphilic Peg-Silanes Containing Siloxane Tethers." American Chemical Society. 2011.

Hawkins, M. et al, "The protein resistance of silicones prepared with a PEO-silane amphiphile." Journal of Materials Chemistry. vol. 22. 2012. pp. 19540-19546.

* cited by examiner

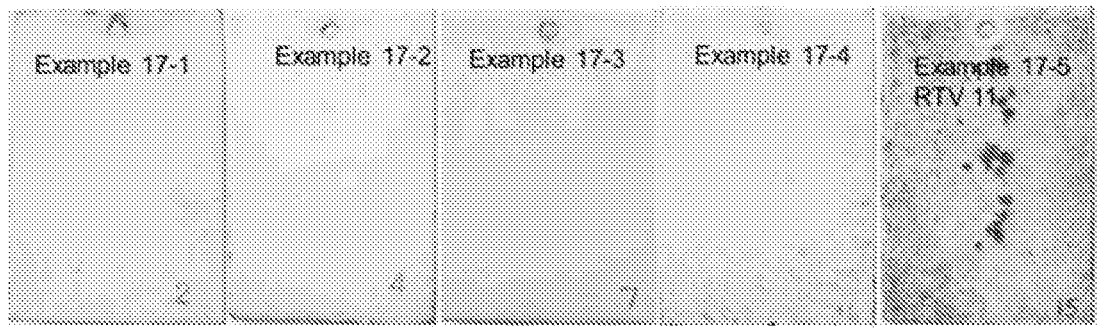

ANTIFOULING SYSTEM COMPRISING SILICONE HYDROGEL

CROSS REFERENCE TO RELATED APPLICATIONS

This application is a 35 U.S.C. 371 national stage filing and claims priority to PCT Application No. PCT/US2013/075046, entitled "Antifouling System Comprising Silicone Hydrogel" filed on Dec. 13, 2013, which claims the benefit of U.S. Provisional Patent Application No. 61/765,450 entitled "Antifouling System Comprising Silicone Hydrogel" filed on Feb. 15, 2013, and PCT Application No. PCT/US2013/042449 entitled "Antifouling System Comprising Silicone Hydrogel" filed on May 23, 2013, each of which is incorporated by reference herein in its entirety.

FIELD

The present technology provides an antifouling coating composition, a coating system comprising such antifouling compositions, and articles comprising such coating systems. The antifouling compositions and coating systems can be utilized on articles exposed to aquatic or marine environments and can provide antifouling properties to the article.

BACKGROUND

Biofouling or biological fouling is the undesirable accumulation of microorganisms, algae, plants, and animals on wetted surfaces. It is found in almost all environments where aqueous liquids are in contact with other materials. The specific and non-specific interactions of proteins and cells with artificial surfaces form the basis of many medical, biochemical, and biotechnological applications. In order to prevent unwanted deposition (or biofouling), any non-specific protein and cell adsorption has to be suppressed. Preventing biological deposits of proteins or bacteria plays a key role in the field of hygiene and in keeping clean surfaces permanently. In addition, unwanted biological deposits on large wetted surfaces, such as ship hulls, water tanks, offshore rigs, etc., and in inaccessible places, such as large pipe systems, represent a major economic problem. Biofouling is on ship hulls, for example, can reduce the performance of the vessel in the water and increase its fuel consumption, which can significantly increase operating cost for ship owners and operators. As much as $50 billion in annual fuel saving has been realized by the shipping industry due to the use of antifouling coatings on ship hulls.

Conventional antifoulants are mostly toxic organometallic compounds or metals such as lead, arsenic, mercury, copper, tin, etc. These materials, however, can pose risks to the environment, and efforts have been made to find environmentally benign technologies.

The current antifouling technologies can be generally classified into four major categories: (1) biocidal antifouling paints containing a marine biocide, (2) non-biocidal electrical coatings, (3) non-biocidal antifouling paints, which almost exclusively function as fouling release, and (4) next generation fouling release products employing amphiphilic polymers or hydrogel materials to deter the settlement of microorganisms on a surface. Recently, hydrogel-forming coatings, in particular polyether-containing hydrogels, have been reported to be especially efficient in preventing marine fouling. Poly(ethyleneglycol) has been known to inhibit adhesion of protein "glue" secreted by the microorganism prior to establishing a thriving colony (see, for example, Merrill E. W., in Poly(ethylene glycol) Chemistry, Ed. J. M. Harris, pp 199-220, Plenum Press, New York: 1992; C.-G. Gölander, Jamea N. Herron, Kap Lim, P. Claesson, P. Stenius, J. D. Andrade, in Poly(ethylene glycol) Chemistry, Ed. J. M. Harris, Plenum Press, New York: 1992). U.S. Pub. No. 2005/0031793 and 2009/0029043 describe the syntheses of multifunctional star shaped polymers and their use for the preparation of thin hydrogel containing surface coatings to actively suppress unspecific protein adsorption.

Cruise et al. (Biomaterials 1998, 19, 1287-1294) and Han et al. (Macromolecules 1997, 30, 6077-6083.0) described the use of acrylate-terminated polymers produced either from the diols or triols of poly(ethyleneglycol) prepolymer for the production of hydrogel layers. The acrylate-terminated prepolymer was crosslinked either on its own or with acrylate-terminated glycerol triol in the presence of added benzyl dimethylketal to form a hydrogel. Hydrogel layers with thicknesses of 135 μM to 180 μM were obtained. Proposed applications for these hydrogel layers include their in vivo use, for example, to suppress post-operative adhesion, as diffusion barriers, for the bonding or sealing of tissues, for in vivo medicamentation and their use as a direct implant, e.g. in the form of a hydrogel cell suspension, peptide hydrogel or a growth factor hydrogel. M. A. Grunlan, et al. prepared siloxane tethered polyethylene glycol with a general formula, $\alpha$-$(EtO)_3Si(CH_2)_2$-oligodimethylsiloxane n-block-poly(ethylene glycol)-$OCH_3$ via regioselective Rh-catalyzed hydrosilylation. The PEG tethered siloxane was subsequently crosslinked with silanol-terminated polydimethylsiloxane. The authors reported that the surface hydrophilicity and protein resistance increased with siloxane tether and that the flexibility of the siloxane subchains enabled the PEG to be more effectively mobilized to the surface (R. Murthy, C. D. Cox, M. S. Hahn, M. A. Grunlan, Biomacromolecules 2007, 8, 3244-3252). Granlan, et al. further reported that such coatings are resistant to marine bacteria (Polymer Preprints 2011, 52(2) 1029).

Silicone antifouling products, i.e., non-biocidal or amphiphilic or hydrogel fouling release technologies, rely on the non-stick feature to discourage the attachment of marine organisms. Such technology is generally only effective when the coated vessel is moving above a certain minimum speed, and does not prevent fouling when the vessel is not in motion or moving slowly. Because of the non-stick nature, typical silicone fouling release coatings do not adhere well to anticorrosion coatings, typically an epoxy coating, that are used to coat the surface of an article such as a ship's hull. Strong adhesion is important to have sufficient coating durability. To overcome the poor adhesion of silicone to epoxy coatings, of a tie coat layer is employed between epoxy and silicone coating layers. However, the use of a tie coat increases the system cost in terms of materials and coating time, often adding an extra day of coating time for the additional coating.

Amphiphilic, silicone hydrogel antifouling coatings such as those described by Grunlan, employ small molecules of polyether-containing silanes to impart protein and marine bacterial resistance. However, the use of the polyether-containing silanes inhibits adhesion of silicone RTV to an epoxy coating.

U.S. Pat. Nos. 4,978,704 and 4,996,112 describe a one part RTV composition using a mixture of an aminosilane and an epoxysilane. U.S. Pub No. 2011/0250350 describes using aminosilanes mixed with silanol-terminated polydiorganosiloxane as a tie coat to improve adhesion. U.S. Pub. No. 2011/0250350 discloses adhesion improvement using bis (trialkoxysilyalky)amine and N,N'-bis(trialkoxysilylalkyl)alkylenediames in a silicone tie coat.

U.S. Pat. No. 6,723,376 describes a coating process using a curable silicon-containing functional group that is capable of latent condensation reaction to form an undercoat and followed by coating a curable polymeric fouling inhibiting material. The curing of the fouling inhibiting material bonds the top coat to the undercoat by condensation reaction with the curable silicon-containing functional groups in the undercoat. U.S. Pat. No. 5,691,019 discloses coating a fouling release layer onto an adhesion promoting anticorrosive layer, where the bonding of the fouling release layer to the anticorrosive layer is enabled by the incorporation of a curable aminosilicone fluid to the anticorrosive layer. The aminosilicone blooms to the interface between anticorrosive layer and fouling release layer to connect the two layers with respective chemical reactions of amines with epoxide of the epoxy layer and alkoxysilane with the silane or silanol of polydimethylsiloxane in the fouling release silicone layer. The incompatible nature of the aminosilicone in the epoxy formula helps the blooming of the aminosilicone. However, the incompatibility also drives up the requirement of the amount of aminosilicone. The aminosilicone molecules tend to aggregate into large globules sporadically scattering on the epoxy surface. Bonding can only occur at the sparsely area where aminosilicone globules cover. It typically requires a very large amount of aminosilicone to fully cover the epoxy surface in order to create sufficient bonding. As a result, the use of aminosilicone for adhesion is not efficient.

SUMMARY

In one aspect, the present invention provides a coating system for coating an article and providing a surface exhibiting an antifouling property. In one aspect, the antifouling coating system comprises (a) a base coating, and (b) an antifouling coating composition, where the coating system is substantially free of a tie-coat layer disposed between the base coating and the antifouling coating.

In one aspect, the present invention provides an antifouling coating system comprising (a) an base coating for coating a substrate, and (b) an antifouling coating composition adapted to be disposed over the base coating, the antifouling coating composition comprising a hydroxyl terminated polydimethylsiloxane, a curable polyether-containing silane of the Formula (1):

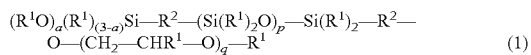

where a is 1-3; $R^1$ is H or an alkyl radical from $C_1$-$C_{10}$; $R^2$ is an alkylene from $C_2$-$C_{10}$; p is 1-100; q is 1-50, optionally an inorganic filler, optionally a silane cross linker, and optionally a condensation catalyst.

In one aspect, the present invention provides an antifouling coating system comprising (a) a base coating composition comprising a base coating material and optionally a first adhesion promoter; and (b) an antifouling coating composition comprising a silane of the formula:

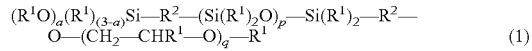

where a is 1-3; $R^1$ is H or alkyl radical from $C_1$-$C_{10}$; $R^2$ is alkylene from $C_2$-$C_{10}$; p is 1-100; q is 1-50, optionally a second adhesion promoter, optionally an inorganic filler, optionally a silane cross linker, and optionally a condensation catalyst.

In one embodiment, the silane is:

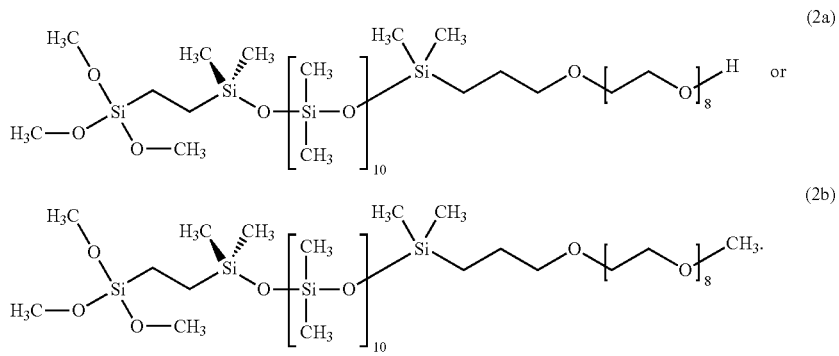

In one embodiment, the antifouling coating composition comprises an adhesion promoter.

In one embodiment, the base coating composition comprises an epoxy modified adhesion promoter. In one embodiment, the adhesion promoter is of the formula (4):

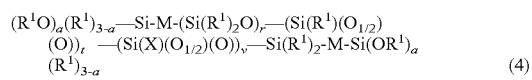

where $R^1$ is H or an alkyl radical; M is $R^2$ or oxygen; r is 0-1000; t is 1 to 20; v is 0 to 20; X is $-R^2-(N(R^7)_{1-b}(Y)_b-R^2)_c-N(R^1)_{2-b}(Y)_b$; c is 0-5; b is 0-2; Y is $R^1$ or an organic radical with an epoxide at one terminal; and $R^2$ is an alkylene from $C_2$-$C_{10}$, with the proviso that at least one Y is an organic radical with an epoxide at one terminal.

In one embodiment, Y comprises a radical of a partially ring opened diglycidoxy ether. In one embodiment, Y comprises a radical of partially ring opened bisphenol A diglycidoxy ether, bisphenol F diglycidoxy ether, epoxy cresol novolac, bis-(3,4-epoxycyclohexyl)adipate (e.g., Cyracure® UVR8128), 3,4-poxycyclohexylmethyl-3,4-epoxycyclohexane carboxylate (e.g., Cyracure® UVR6110).

In one embodiment, the epoxy modified adhesion promoter is made in situ by addition to a base coating composition comprising an epoxy resin at least one molecule having the chemical formula:

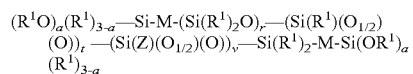

where $R^1$ is H or an alkyl radical; M is $R^2$ or oxygen; r is 0-1000; t is 1 to 20; v is 0 to 20; Z is $-R^2-(NR^1-R^2)_c-NR^12$; and c is 0-5.

In one embodiment, the epoxy modified adhesion promoter is of the formula:

(5a)

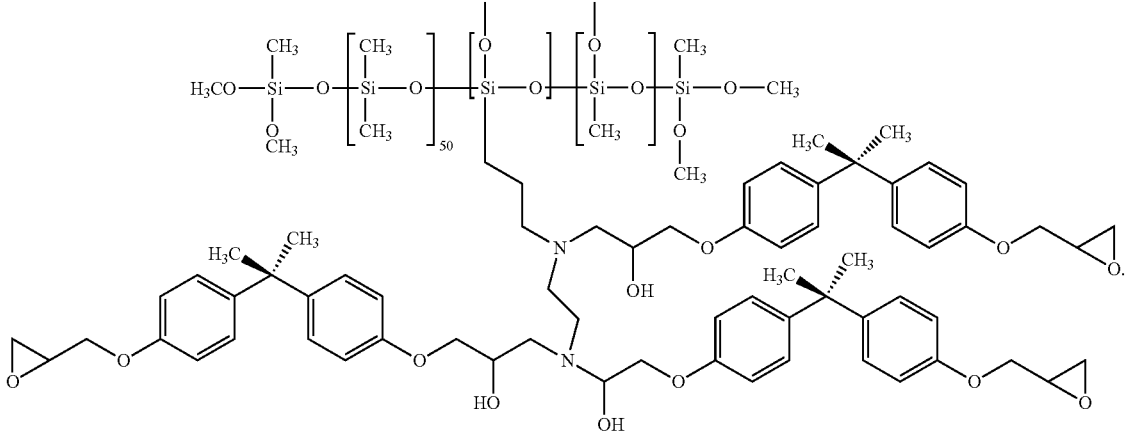

In one embodiment, the antifouling coating composition comprises an adhesion promoter, and the anticorrosive composition comprises an epoxy modified adhesion promoter.

In one aspect, the present invention provides an article comprising the coating system. In one embodiment, an article comprises a substrate having an outer surface, a base coating composition, and an antifouling coating composition in accordance with aspects and embodiments of the invention. In one embodiment, the article is substantially free of a tie-coat layer disposed between the anticorrosive composition and the antifouling coating composition.

In one aspect, the present invention provides a method of coating a substrate to provide the substrate with an antifouling surface. In one embodiment, the method comprises (a) applying a base coating composition to a surface of a substrate, and (b) applying an antifouling coating composition onto the base coating composition, the antifouling coating composition comprising a hydroxyl terminated polydimethylsiloxane, a curable polyether-containing silane of the Formula (1):

$$(R^1O)_a(R^1)_{(3-a)}Si-R^2-(Si(R^1)_2O)_p-Si(R^1)_2-R^2-O-(CH_2-CHR^1-O)_q-R^1 \quad (1)$$

where a is 1-3; $R^1$ is H or alkyl radical from $C_1$-$C_{10}$; R2 is alkylene from $C_2$-$C_{10}$; p is 1-100; q is 1-50, optionally an inorganic filler, optionally a silane cross linker, and optionally a condensation catalyst.

The removal of the tie coat not only will reduce the labor and material costs but also cut down the costs of shipyard and coating equipment rentals. In addition, eliminating tie coat layer erases an extra coating day in the dry dock, which gives additional scheduling flexibility for the shipyards and avoids the loss of an extra day of revenue generation for the ship operators.

In another aspect, the present invention provides a coating composition comprising a film forming material and a compound of the formula:

$$(R^1O)_a(R^1)_{3-a}-Si-M-(Si(R^1)_2O)_r-(Si(R^1)(O_{1/2}) (O))_t-(Si(X)(O_{1/2})(O))_v-Si(R^1)_2-M-Si(OR^1)_a (R^1)_{3-a}$$

where $R^1$ is H or an alkyl radical M is $R^2$ or oxygen; r is 0-1000; t is 1 to 20; v is 0 to 20; X is $-R^2-(N(R^1)_{1-b}(Y)_b-R^2)_c-N(R^1)_{2-b}(Y)_b$; c is 0-5; b is 0-2; Y is $R^1$ or an organic radical with an epoxide at one terminal; and $R^2$ is an alkylene from $C_2$-$C_{10}$, with the proviso that at least one Y is an organic radical with an epoxide at one terminal.

In another aspect, the present invention provides a compound of the formula:

$$(R^1O)_a(R^1)_{3-a}-Si-M-(Si(R^1)_2O)_r-(Si(R^1)(O_{1/2}) (O))_t-(Si(X)(O_{1/2})(O))_v-Si(R^1)_2-M-Si(OR^1)_a (R^1)_{3-a}$$

where $R^1$ is H or an alkyl radical M is $R^2$ or oxygen; r is 0-1000; t is 1 to 20; v is 0 to 20; X is $-R^2-(N(R^1)_{1-b}(Y)_b-R^2)_c-N(R^1)_{2-b}(Y)_b$; c is 0-5; b is 0-2; Y is $R^1$ or an organic radical with an epoxide at one terminal; and $R^2$ is an alkylene from $C_2$-$C_{10}$, with the proviso that at least one Y is an organic radical with an epoxide at one terminal.

In another aspect, the present invention provides an antifouling coating system comprising a base coating composition comprising a base coating material and an epoxy modified adhesion promoter wherein the epoxy modified adhesion promoter comprises at least one molecule having the chemical formula:

$$(R^1O)_a(R^1)_{3-a}-Si-M-(Si(R^1)_2O)_r-(Si(R^1)(O_{1/2}) (O))_t-(Si(X)(O_{1/2})(O))_v-Si(R^1)_2-M-Si(OR^1)_a (R^1)_{3-a}$$

where $R^1$ is H or an alkyl radical M is $R^2$ or oxygen; r is 0-1000; t is 1 to 20; v is 0 to 20; X is $-R^2-(N(R^1)_{1-b}(Y)_b-R^2)_c-N(R^1)_{2-b}(Y)_b$; b is 0-2; c is 0-5; b is 0-1; Y is $R^1$ or an organic radical with an epoxide at one terminal; and $R^2$ is an alkylene from $C_2$-$C_{10}$, with the proviso that at least one Y is an organic radical with an epoxide at one terminal; and an antifouling coating composition comprising a silicone elastomer and optionally an inorganic filler, optionally a silane cross linker, and optionally a condensation catalyst.

In yet another aspect, the present invention provides an antifouling coating system comprising a base coating composition comprising a base coating material; a tie coat; and an antifouling coating composition the antifouling composition comprising a silane of the formula:

$$(R^1O)_a(R^1)_{(3-a)}Si-R^2-(Si(R^1)_2O)_p-Si(R^1)_2-R^2-O-(CH_2-CHR^1-O)_q-R^1 \quad (1)$$

where a is 1-3; $R^1$ is H or alkyl radical from $C_1$-$C_{10}$; $R^2$ is alkylene from $C_2$-$C_{10}$; p is 1-100; q is 1-50, optionally an inorganic filler, optionally a silane cross linker, and optionally a condensation catalyst.

In still another aspect, the present invention provides an antifouling coating system comprising:

(a) a base coating composition comprising a base coating material and optionally a first adhesion promoter; and (b) an antifouling coating composition comprising (i) a silane of the formula:

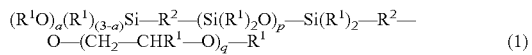

where a is independently 1-3; $R^1$ is independently chosen from a H or a $C_1$-$C_{10}$alkyl radical; $R^2$ is independently chosen from a $C_2$-$C_{10}$alkylene; p is 1-100; q is 1-50;

(ii) a functionalized polymer of the formula:

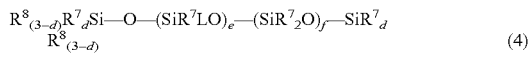

wherein L is —(SiR$^7_2$O)$_n$—SiR$^7_d$R$^8_{(3-d)}$; $R^7$ is independently chosen from a C1 to C10 alkyl, or a substituted or un-substituted phenyl group; $R^8$ is independently chosen from an alkoxy, an acetoxy, or a ketoxime radical; d is independently 0-2; e is 1-10,000; and f is 10-100,000;

(iii) optionally a second adhesion promoter; (iv) optionally an inorganic filler; and (v) optionally a silane cross linker, and optionally a condensation catalyst.

In even a further embodiment, the present invention provides an antifouling coating system comprising:

(a) a base coating composition comprising a base coating material and optionally, a first adhesion promoter;

(b) an antifouling coating composition comprising (i) a silane of the formula:

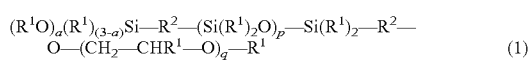

where a is 1-3; $R^1$ is independently chosen from H or alkyl radical from $C_1$-$C_{10}$; $R^2$ is a $C_2$-$C_{10}$alkylene; p is 1-100; q is 1-50; (ii) a functionalized polymer; (iii) a second adhesion promoter of the formula U-Q-R$^{11}$—SiR$^9_g$R$^{10}_{(3-g)}$ wherein Q is —CH$_2$CH(OH)—O— or —CH$_2$CH(OH)CH$_2$—NR$^{12}$—; U is:

—O—(C$_6$H$_h$R$^9_{(4-h)}$—CR$^{13}$—C$_6$H$_h$R$^9_{(4-h)}$—O—CH$_2$CH(OH)CH$_2$—O)$_i$—C$_6$H$_h$R$^9_{(4-h)}$—CR$^{13}$—C$_6$H$_h$R$^9_{(4-h)}$—O—Z;

where $R^9$ is independently chosen from a C1 to C10 alkyl or a substituted or un-substituted phenyl group; $R^{10}$ is independently chosen from an alkoxy, an acetoxy, or a ketoxime radical; $R^{11}$ is a C1 to C4 alkylene g is 0-2; h is 0-4; where $R^{12}$ is H or CH$_2$CH(OH)CH$_2$—U—; $R^{13}$ is independently H or alkyl; i is 0-100; and Z is H, Q-SiR$^9_h$R$^{10}_{(3-h)}$, or

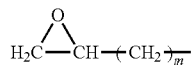

where m is 1-20; (iv) optionally an inorganic filler; and (v) optionally a silane cross linker, and optionally a condensation catalyst.

These and other aspects are further understood with respect to the following detailed description.

BRIEF DESCRIPTION OF THE DRAWINGS

FIG. 1 is a photograph showing panels coated with antifouling compositions in accordance with embodiments of the invention compared to a panel coated with a conventional silicone compound after exposure to oceanic conditions.

DETAILED DESCRIPTION

The present invention provides an antifouling coating composition and a coating system comprising such antifouling coating composition. In embodiments, the system is such that a tie-coat layer is not required. In one aspect, the antifouling coating system comprises (a) a base coating composition for coating a target substrate, and (b) an antifouling coating composition. The system is substantially free of a tie-coat layer between the base coating composition (a) and the antifouling coating composition (b). In another aspect, the present invention the antifouling coating composition comprises a single layer coating composition. The present invention also provides a novel compound that can be used as an adhesion promoter and optimally as a material to provide a composition with antifouling characteristics.

The singular forms "a," "an" and "the" include plural referents unless the context clearly dictates otherwise.

As used herein, the term "antifouling coating composition" refers to a coating composition that is applicable to a surface and capable of preventing aquatic organisms from depositing (or fouling) and growing on the surface.

Multi-Layer Antifouling Coating System

In one aspect, the present technology provides a multi-layer antifouling coating system comprising (a) a base coating composition for coating a target substrate, and (b) an antifouling coating composition. The system, while comprising multiple layers, is such that it is substantially free of a tie-coat layer between base coating and the antifouling coating.

The antifouling coating comprises (a) a curable polyether-containing silane, and (b) a functionalized polymer. In one embodiment, the antifouling coating further comprises (c) an adhesion promoter. The antifouling coating composition can also comprise other optional components including, but not limited to an inorganic filler, a crosslinker, a condensation catalyst, etc., or combinations of two or more thereof.

The curable polyether-containing silane comprises a polymer of the Formula (1):

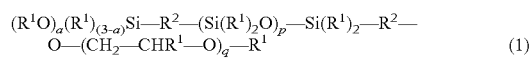

where a is 1-3; $R^1$ is H or alkyl radical from $C_1$-$C_{10}$; $R^2$ is alkylene from $C_2$-$C_{10}$; p is 1-100; and q is 1-50. In one embodiment, p is from 1-20; from 3-15; even from 5-12. In one embodiment, q is from 1 to 20; 3 to 15; even 5 to 10. In one embodiment, q is 8. Here as elsewhere in the specification and claims, numerical values can be combined to form new and non-disclosed ranges.

Non-limiting examples of suitable polyether-containing silanes are the silanes of Formula (2a) and (2b):

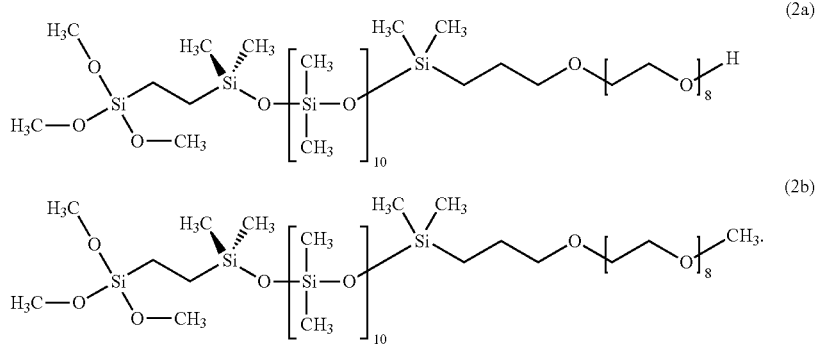

The functionalized polymer comprises a reactive functional group. In one embodiment, the functionalized polymer is a hydroxyl terminated polymer. The hydroxyl terminated polymer comprises a material capable of reacting with the polyether-containing silane. In one embodiment, the hydroxyl terminated polymer comprises a silanol terminate polymer. An example of a suitable silanol terminated polymer is a hydroxyl terminated polydimethyl siloxane. In one embodiment, the silanol terminated polymer comprises an alpha,omega-bis(SiOH) terminated polymer. In one embodiment, the silanol terminated polymer comprises an alpha, omega-bis(SiOH)polydimethylsilsiloxane.

In one embodiment, the hydroxyl terminated polymer comprises a polymer of the Formula (3):

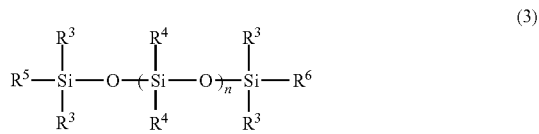

where n is 1-100,000; $R^3$ is individually chosen from OH, $OR^1$, alkyl, and combinations of two or more thereof; $R^1$ is H or an alkyl radical (e.g., a $C_1$-$C_{10}$ alkyl radical); $R^4$ is individually chosen from alkyl, fluoro alkyl, alkyl aryl or $R^5$; $R^5$ is OH or $OR^1$; and $R^6$ is OH or $OR^1$, where at least one of $R^3$, $R^4$, $R^5$, or $R^6$ is OH. In one embodiment, $R^5$ and $R^6$ are OH.

In one embodiment, the functionalized polymer is a polymer comprising an alkoxy radical, an acetoxy radical, a ketoxime radical, or a combination of two or more thereof. In one embodiment, the functionalized polymer is a polymer of the Formula (4):

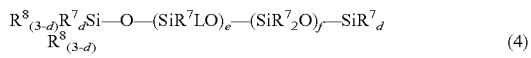

wherein L is $-(SiR^7{}_2O)_f-SiR^7{}_dR^8{}_{(3-d)}$; $R^7$ is independently chosen from a C1 to C10 alkyl or a substituted or un-substituted phenyl group; $R^8$ is independently chosen form an alkoxy, an acetoxy or a ketoxime radical; d is independently 0-2; e is independently 1-10,000; and f is independently 10-100,000. In one embodiment, $R^8$ is an acetoxy radical. Examples of suitable compounds of the Formula (4) include, but are not limited to, alpha,gamma-bis(methyl diacetoxysilyl)polydimethyl-siloxane.

It will be appreciated that the antifouling coating composition can include a combination of two or more function alized polymers. The polymers can be of the same type (e.g., hydroxyl functional, or a mixture of polymers having different functionalities).

The curable polyether-containing silane component can be present in the antifouling coating composition based on the cured coating in an amount of from about 0.1 weight percent to about 40 weight percent; from about 1 weight percent to about 30 weight percent; even from about 5 weight percent to about 20 weight percent. The functionalized polymer can be present in an amount of from about 10 weight percent to about 99 weight percent; from about 20 weight percent to about 80 weight percent; even from about 40 weight percent to about 70 weight percent. Here as elsewhere in the specification and claims, numerical values can be combined to form new and non-disclosed ranges.

The antifouling coating composition can also comprise an adhesion promoter. The adhesion promoter can be chosen from adhesion-promoting silanes including, but not limited to, gamma-glycidoxypropyltrimethoxysilane, gamma-aminopropyltrimethoxysilane, N-beta-(aminoethyl)-gamma-aminopropyltrimethoxysilane, bis-(gamma-trimethoxysilylpropyl)amine, N-beta-(aminoethyl)-gamma-aminopropylmethyldimethoxysilane, tris-(gamma-trimethoxylsilyl)isocyanurate, etc. and combinations of two or more thereof. The adhesion promoter can also be selected from organic epoxy compounds and a combination of an epoxy compound and an adhesion promoting silane. In one embodiments in which the antifouling coating composition comprised an aminosilane and an epoxy compound.

In one embodiment, the antifouling coating composition comprises an adhesion promoter of the Formula (5):

wherein Q is $-CH_2CH(OH)-O-$ or $-CH_2CH(OH)CH_2-NR^{12}-$; U is:

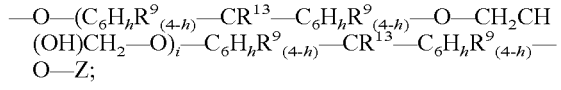

where $R^9$ is chosen from a C1 to C10 alkyl or a substituted or un-substituted phenyl group; $R^{10}$ is chosen from an alkoxy, an acetoxy, or a ketoxime radical; $R^{11}$ is a C1 to C4 alkylene; g is 0-2; h is 0-4, $R^{12}$ is H or $CH_2CH(OH)CH_2-U-$; $R^{13}$ is H or an alkyl; i is 0-100; and Z is H, $Q-SiR^9{}_hR^{10}{}_{(3-h)}$, or

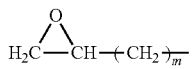

where m is 1-20.

In one embodiment, the adhesion promoter of the Formula 5 is a reaction product of Epon 828 and A-1100 having the Formula (5a) or (5b):

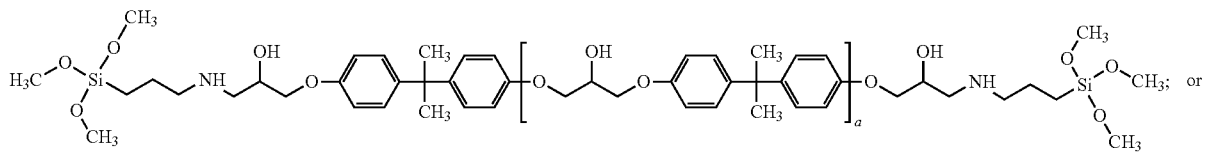

(5a)

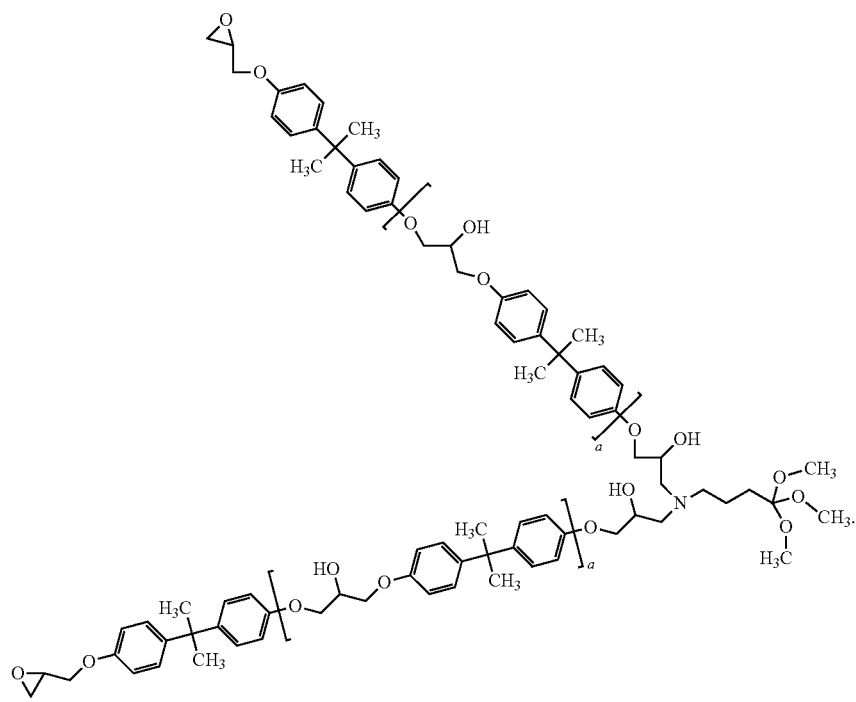

(5b)

In embodiments in which the antifouling coating composition comprises an adhesion promoter, the adhesion promoter can be present in an amount of from about 0.1 weight percent to about 10 weight percent; from about 1 weight percent to about 7 weight percent; even from about 2 weight percent to about 5 weight percent based on cured coating.

The antifouling coating composition can optionally comprise a filler material. In one embodiment, the filler is an inorganic filler. Fillers can be particulates, fibers, pellets, aggregates, agglomerates and granulates. Examples of suitable fillers include, but are not limited to, clays, alumina-silicates, talc, wollastonite, mica, fumed silica, precipitated silica, calcium carbonates, etc. and combinations of two or more thereof. Treated calcium carbonates are available under several trade names Ultra Pflex, Super Pflex, Hi Pflex from Specialty Minerals; Winnofil SPM, SPT from Solvay; Hubercarb 1at, Hubercarb 3Qt and Hubercarb W from Huber; Kotomite from ECC; and Omyacarb FT and BLP-3 from Omva. Particulate materials such as any of the foregoing can be present in the antifouling coating composition comprising in an amount of from 0 to 70, even from 35 to 60, weight parts per 100 weight parts of the total composition based on cured coating.

The antifouling coating composition can optionally comprise a crosslinker. In one embodiment, the crosslinker comprises a silane crosslinker. Examples of suitable cross-linkers include, but are not limited to, an alkoxysilane, an alkoxysiloxane, an oximosilane, an oximosiloxane, an enoxysilane, an enoxysiloxane, an aminosilane, a carboxysilane, a carboxysiloxane, an alkylamidosilane, an alkylamidosiloxane, an arylamidosilane, an arylamidosiloxane, an alkoxyaminosilane, an alkaryaminosiloxane, an alkoxycarbamatosilane, an alkoxycarbamatosiloxane, an imidatosilane, a ureidosilane, an isocyanatosilane, a thioisocyanatosilane, and combinations of two or more thereof. Examples of suitable cross-linkers include, but are not limited to, tetraethylorthosilicate (TEOS); methyltrimethoxysilane (MTMS); methyltriethoxysilane; vinyltrimethoxysilane; vinyltriethoxysilane; methylphenyldimethoxysilane; 3,3,3-trifluoropropyltrimethoxysilane; methyltriacetoxysilane; vinyltriacetoxysilane; ethyltriacetoxysilane; di-butoxydiacetoxysilane; phenyltripropionoxysilane; methyltris(methylethylketoxime)silane; vinyltris(methylethylketoxime)silane; 3,3,3-trifluoropropyltris(methylethylketoxime)silane; methyltris(isopropenoxy)silane; vinyltris(isopropenoxy)silane; ethylpolysilicate; dimethyltetraacetoxydisiloxane; tetra-n-propylorthosilicate; methyldimethoxy(ethylmethylketoximo)silane; methylmethoxybis-(ethylmethylketoximo)silane; methyldimethoxy(acetaldoximo)silane;

methyldimethoxy(N-methylcarbamato)silane; ethyldimethoxy(N-methylcarbamato)silane; methyldimethoxyisopropenoxysilane; trimethoxyisopropenoxysilane; methyltri-isopropenoxysilane; methyldimethoxy(but-2-ene-2-oxy)silane; methyldimethoxy(1-phenylethenoxy)silane; methyldimethoxy-2(1-carboethoxypropenoxy)silane; methylmethoxydi-N-methylaminosilane; vinyldimethoxymethylaminosilane; tetra-N,N-diethylaminosilane; methyldimethoxymethylaminosilane; methyltricyclohexylaminosilane; methyldimethoxyethylaminosilane; dimethyldi-N,N-dimethylaminosilane; methyldimethoxyisopropylaminosilane dimethyldi-N,N-diethylaminosilane. ethyldimethoxy(N-ethylpropionamido)silane; methyldimethoxy(N-methylacetamido)silane; methyltris(N-methylacetamido)silane; ethyldimethoxy(N-methylacetamido)silane; methyltris(N-methylbenzamido)silane; methylmethoxybis(N-methylacetamido)silane; methyldimethoxy(caprolactamo)silane; trimethoxy(N-methylacetamido)silane; methyldimethoxyethylacetimidatosilane; methyldimethoxypropylacetimidatosilane; methyldimethoxy(N,N',N'-trimethylureido)silane; methyldimethoxy(N-allyl-N',N'-dimethylureido)silane; methyldimethoxy(N-phenyl-N',N'-dimethylureido)silane; methyldimethoxyisocyanatosilane; dimethoxydiisocyanatosilane; methyldimethoxythioisocyanatosilane; methylmethoxydithioisocyanatosilane, etc., and combinations of two or more thereof.

The antifouling coating composition can optionally comprise a catalyst. In one embodiment, the crosslinker comprises a catalyst suitable for promoting the curing of siloxanes. Advantageously, condensation catalysts are employed since these will also catalyze the cure (hydrolysis of the alkoxysilyl groups and condensation of the resulting silanols) of the silylated polymer component of the moisture-curable compositions of the invention. Suitable condensation catalysts include, but are not limited to, dialkyltin dicarboxylates such as dibutyltin dilaurate and dioctyltin dilaurate, tertiary amines, the stannous salts of carboxylic acids, such as stannous octoate and stannous acetate, and the like. Other useful catalysts include zirconium-containing, aluminum-containing, and bismuth-containing complexes such as KAT XC6212, K-KAT 5218 and K-KAT 348, supplied by King Industries, Inc., titanium chelates such as the TYZOR®. types, available from DuPont company, and the KR types, available from Kenrich Petrochemical, Inc., and other organometallic catalysts, e.g., those containing a metal such as Al, Zn, Co, Ni, Fe, etc.

The base coating is not particularly limited and can be chosen as desired for a particular purpose or intended application. The base coating layer may be any material suitable for forming a coating layer in an antifouling coating. Non-limiting examples include epoxy coatings, room-temperature curable silicone coatings, epoxy-silicone coatings, etc.

In one embodiment, the base coating layer is formed from an epoxy resin composition. The epoxy coating is generally formed by curing an epoxy resin composition that comprises an epoxy resin and an amine-based curing agent for curing the epoxy resin.

The epoxy resin can be chosen from any suitable epoxy resin including, but not limited to, bisphenol epoxy resin, glycidylester epoxy resin, glycidylamine epoxy resin, phenol novolac epoxy resin, cresol epoxy resin, dimer acid modified epoxy resin, aliphatic epoxy resin, alicyclic epoxy resin, epoxidized oil epoxy resin, etc., and combinations of two or more thereof. Non-limiting examples of suitable bisphenol epoxy resins include bisphenol A-type and F-type resins.

In one embodiment, the epoxy resin comprises from about 10 to about 60% by weight of the base coat composition; even from about 20 to about 50% by weight of the base coat composition.

Examples of commercially-available products that can be used as the epoxy resin include, but are not limited to, bisphenol epoxy resins such as Epikote and Epikure resins available from Momentive Specialty Chemicals, including, for example, Epikote 828, Epikote 834, Epikote 1001, Epikote 1004, Epikote 807, Epikote 4004P, Epikote 4007P, etc.

The base coat composition also generally includes an amine-based curing agent for curing the epoxy resin. Examples of suitable amine-based curing agents include, for example, modified Mannich amines formed by Mannich condensation reaction of phenols, formalin, and amine compounds, aliphatic polyamine, etc. In one embodiment, the amine-based curing agent may be present in an amount such that the number of amino groups of the amine-based curing agent is chemically equivalent to the number of epoxy groups of the epoxy resin. In another embodiment, the curing agent can be present in an amount providing an amino group to epoxy group ratio of 0.35:1 to 0.9:1; even 0.4:1 to 0.8:1. In still another embodiment, the amine-based curing agent can be present in an amount of about 10 to about 80 parts by weight with respect to 100 parts by weight of the epoxy resin. Here as elsewhere in the specification and claims, numerical values can be combined to form new and non-disclosed ranges.

Non-limiting examples of commercially-available products that can be used as the amine-based curing agent for the epoxy resin include Epikure 3292-FX60 (Momentive Specialty Chemicals), Raccamide TD966 (Dainippon Ink and Chemicals, Incorporated), Sunmide 307D-60 (Sanwa Chemical Co., Ltd.), etc.

Other suitable base coating materials include, but are not limited to, room-temperature curable silicone coatings, epoxy-silicone coatings, and silicone epoxy hybrid. These materials are not particularly limited and any compositions suitable for use in anti-fouling applications may be used to form the coating. Non-limiting examples of suitable room-temperature curable silicone compositions include those described in U.S. Pat. Nos. 5,449,553; 6,165,620; and 7,666,514. Non-limiting examples of suitable epoxy-siloxane copolymers for the coating include those described in U.S. Pat. No. 6,391,464.

The base coating optionally comprises an adhesion promoter. In one embodiment, the base coating composition is an epoxy modified adhesion promoter. In one embodiment, the epoxy modified adhesion promoter comprises a curable amino silicone material and an epoxy compound, where the epoxy modified adhesion promoter is not fully compatible with the base polymer of the base coating. The base coating can comprise the epoxy modified adhesion promoter in an amount of from about 0.1 weight percent to about 20 weight percent; from about 0.3 weight percent to about 5 weight percent; even from about 0.5 weight percent to about 2 weight percent. Here as elsewhere in the specification and claims, numerical values can be combined to form new and non-disclosed ranges.

In one embodiment, the epoxy modified adhesion promoter is of the Formula (6):

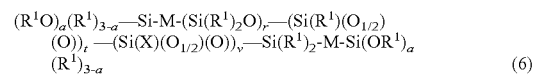

$$(R^1O)_a(R^1)_{3-a}\text{—Si-M-}(Si(R^1)_2O)_r\text{—}(Si(R^1)(O_{1/2})(O))_t\text{—}(Si(X)(O_{1/2})(O))_v\text{—Si}(R^1)_2\text{-M-Si}(OR^1)_a$$
$$(R^1)_{3-a} \qquad (6)$$

where $R^1$ is H or an alkyl radical M is $R^2$ or oxygen; r is 0-1000; t is 1 to 20; v is 0 to 20; X is $-R^2-(N(R^1)_{1-b}(Y)_b-R^2)_c-N(R^1)_{2-b}(Y)_b$; c is 0-5; b is 0-2; Y is $R^1$ or an organic radical with an epoxide at one terminal; and $R^2$ is an alkylene from $C_2$-$C_{10}$, with at least one epoxy functional group and at least one Y is an organic radical with an epoxide at one terminal.

In one embodiment, Y comprises a radical of partially ring opened bisphenol A diglycidoxy ether, bisphenol F diglycidoxy ether, epoxy cresol novolac, bis-(3,4-epoxycyclohexyl)adipate (e.g., Cyracure® UVR8128), 3,4-poxycyclohexylmethyl-3,4-epoxycyclohexane carboxylate (e.g., Cyracure® UVR6110).

In one embodiment, the epoxy modified adhesion promoter is of the Formula (7):

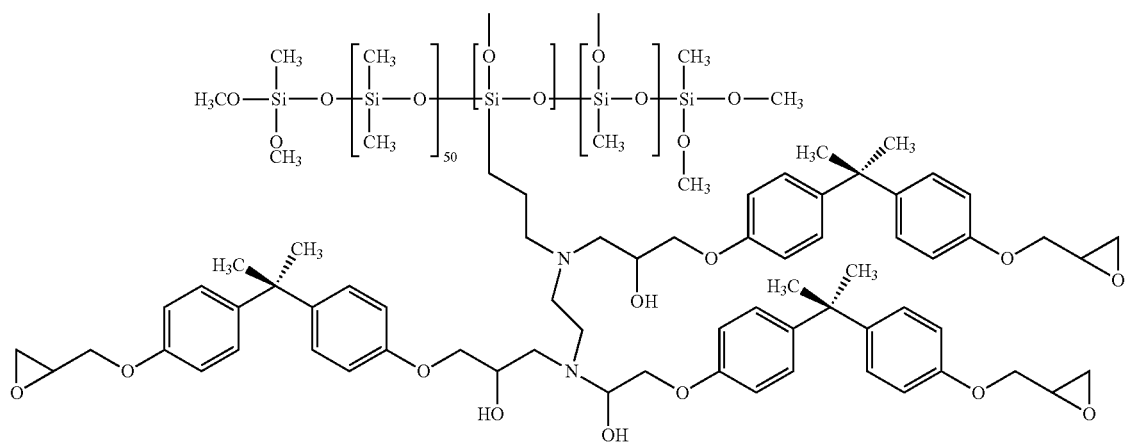

(7)

The epoxy modified adhesion promoter can be prepared by the partial ring opening of the respective epoxy compound(s) with an aminosilicone. The adhesion promoter can be premade before addition to the base coat formula or it can be made in situ by adding the respective aminosilicone to the epoxy base coat formula directly. In one embodiment, the reactive aminosilicone is formulated with base coat compound prior to coating.

In one embodiment, when the antifouling coating composition comprises an adhesion promoter of Formula (5), the base coating composition can comprise an epoxy modified adhesion promoter or an adhesion promoter does not contain epoxy functional groups. In such embodiments, the adhesion promoter in the base coating composition can be a silane-based adhesion promoter such as those describe with respect to the antifouling coating composition. In one embodiment, where the antifouling coating composition includes an adhesion promoter of Formula (5), the adhesion promoter in the base coating composition can be a compound of the Formula (6) where Y is $R^1$ or an organic radical (i.e., there does not have to be at least one Y with an epoxide at one terminal.

The base coating composition can comprise other additives to the base coating with particular properties or characteristics as desired for a particular purpose or intended use. Suitable additives can include, for example, an antimicrobial agent, a pigment, an anti-sagging agent, etc.

The antimicrobial agent is not particularly limited and can generally be any antimicrobial agent that is compatible with the base coating compositions or the resulting hydrogels. Suitable antimicrobial agents include, but are not limited to, chlorhexidine salts such as chlorhexidine gluconate (CHG), parachlorometaxylenol (PCMX), triclosan, hexachlorophene, fatty acid monoesters and monoethers of glycerin and propylene glycol such as glycerol monolaurate, glycerol monocaprylate, glycerol monocaprate, propylene glycol monolaurate, propylene glycol monocaprylate, propylene glycol moncaprate, phenols, surfactants and polymers that include a ($C_{12}$-$C_{22}$) hydrophobe and a quaternary ammonium group or a protonated tertiary amino group, quaternary amino-containing compounds such as quaternary silanes and polyquaternary amines such as polyhexamethylene biguanide, silver containing compounds such as silver metal, silver salts such as silver chloride, silver oxide and silver sulfadiazine, methyl parabens, ethyl parabens, propyl parabens, butyl parabens, octenidene, 2-bromo-2-nitropropane-1,3 diol, or mixtures of two or more thereof.

Non-limiting examples of suitable quaternary ammonium compounds and phenolic antimicrobial agents include benzalkonium chlorides and/or substituted benzalkonium chlorides, di($C_6$-$C_{14}$)alkyl di short chain (C1-4 alkyl and/or hydroxyalkyl) quaternaryammonium salts, N-(3-chloroallyl) hexaminium chlorides, benzethonium chloride, methylbenzethonium chloride, and cetylpyridinium chloride. Other suitable quaternary compounds include alkyl dimethylbenzylammonium chlorides, dialkylmethylbenzylammonium chlorides, and mixtures of two or more thereof. An example of a suitable quaternary amine containing silane is octadecyldimethyl(3-trimethoxysilyl propyl) ammonium chloride from Gelest, Inc.

Examples of suitable pigments include, but are not limited to, talc, silica, mica, clay, calcium carbonate, kaolin, alumina white, white carbon, aluminum hydroxide, magnesium carbonate, barium carbonate, barium sulfate, titanium dioxide, carbon black, etc., and combinations of two or more thereof. In one embodiment, the body pigment may be present in the composition in an amount, for example, of about 5 to about 80% by weight with respect to 100% by weight of the solid content of the base coat composition.

Examples of suitable anti-sagging agents include, but are not limited to, organic clay wax such as amine salt, stearate, lecithinate, alkylsulfonate of Al, Ca and Zn, polyethylene wax, amide wax, hydrogenated castor oil wax, polyamide wax, a mixture of hydrogenated castor oil wax and polyamide wax, synthetic particulate silica, polyethylene oxide wax, etc., and combinations of two or more thereof. The anti-sagging agent may be present in an amount of about 0.1 to about 5% by weight with respect to 100% by weight of the base coat composition.

Each of the above components can be combined with the epoxy resin composition according to any suitable method at the desired ratios during preparation of the composition, by using, for example, commercially-available materials. Further, in addition to the above components, optional components such as a solvent, a liquid hydrocarbon resin, a surfactant, an anticorrosive pigment, and the like, that are used in an epoxy resin anticorrosive coating film may be added in appropriate quantities if necessary. In one embodiment, the epoxy resin base coat composition may be provided as a two-part composition comprising a main agent component containing the epoxy resin and a curing agent component containing the amine-based curing agent.

The antifouling coating composition and the base coating composition provide an antifouling coating system. In accordance with aspects of the invention. The antifouling coating system is substantially free of a tie-coat layer disposed between the base coating and the antifouling coating composition. That is, in aspects of the invention, the antifouling coating composition is disposed immediately adjacent or adhered to the base coating composition. In embodiments, the antifouling coating composition sufficiently adheres to the base coating composition such that an adhesive or binding layer such as a tie-coat layer is not required.

In one embodiment, the antifouling system comprises (a) an antifouling coating composition, and (b) a base coating composition, where the antifouling coating composition comprises a silane of the Formula (1).

In one embodiment, the antifouling system comprises (a) an antifouling coating composition, and (b) a base coating composition, where the antifouling coating composition comprises a silane of the Formula (1) and an adhesion promoter.

In one embodiment, the antifouling system comprises (a) an antifouling coating composition, and (b) a base coating composition, where the antifouling coating composition comprises a silane of the Formula (1), and the base coating composition comprises an epoxy modified adhesion promoter.

In one embodiment, the antifouling system comprises (a) an antifouling coating composition, and (b) a base coating composition, where the antifouling coating composition comprises a silane of the Formula (1) and an adhesion promoter, and the base coating composition comprises an epoxy modified adhesion promoter.

Single Layer Coating System

In another aspect, the present technology provides a single layer coating system. The single layer coating system can comprise any suitable coating or film forming material and a compound of the Formula (6):

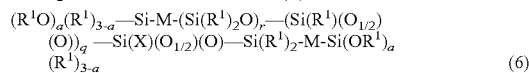

(6)

where $R^1$ is H or an alkyl radical M is $R^2$ or oxygen; r is 0-1000; t is 1 to 20; v is 0 to 20; X is $-R^2-(N(R^1)_{1-b}(Y)_b-R^2)_c-N(R^1)_{2-b}(Y)_b$; c is 0-5; b is 0-2; Y is $R^1$ or an organic radical with an epoxide at one terminal; and $R^2$ is an alkylene from $C_2$-$C_{10}$, with the proviso that at least one Y is an organic radical with an epoxide at one terminal. The coating or film forming material can be any material as desired for a particular purpose or intended application. In one embodiment, the coating or film forming material can be any material suitable as a base coating composition described above with respect to the multilayer coating system including, but not limited to, an epoxy, a curable silicone, an epoxy-silicone, etc.

The compound of the formula can provide the film with antifouling properties and can be suitable for use in such applications. In one embodiment, the single layer antifouling coating system comprises a compound of the Formula (6) in an amount of from about 0.1 weight percent to about 20 weight percent; from about 0.25 weight percent to about 15 weight percent; from about 0.3 weight percent to about 10 weight percent; from about 0.5 weight percent to about 5 weight percent; from about 0.75 weight percent to about 2 weight percent. Here as elsewhere in the specification and claims, numerical values can be combined to form new and non-disclosed ranges.

Multi-Layer Antifouling System

In still another aspect, the present technology also provides a multi-system. The multi-layer antifouling system comprises, in one embodiment, three layers: an antifouling top coat, a tie coat, and an anticorrosion base coat. In one embodiment, the antifouling system comprises (a) an antifouling coating composition, (b) a tie coat, and (c) a base coating composition, where the antifouling coating composition comprises a silane of the Formula (1).

In one embodiment, the antifouling system comprises (a) an antifouling coating composition, (b) a tie coat, and (c) a base coating composition, where the antifouling coating composition comprises a silane of the Formula (1) and an adhesion promoter.

In one embodiment, the antifouling system comprises (a) an antifouling coating composition, (b) a tie coat, and (c) a base coating composition, where the antifouling coating composition comprises a silane of the Formula (1), and the base coating composition comprises an epoxy modified adhesion promoter.

In one embodiment, the antifouling system comprises (a) an antifouling coating composition, (b) a tie coat, and (c) a base coating composition, where the antifouling coating composition comprises a silane of the Formula (1) and an adhesion promoter, and the base coating composition comprises an epoxy modified adhesion promoter.

Applications

The antifouling systems (either as a multi-layer or single layer system) can be used in a variety of applications where antifouling and/or antimicrobial properties are desired. The antifouling system comprising a silane of Formula (1) can be used to prevent the adsorption of proteins and cells on a surface.

The base coat can be applied to and adhere to a variety of surfaces including, but not limited to metal (e.g., steel, iron, aluminum, etc.), fiberglass, wood, FRP, concrete etc.

The coating system can be applied to a target substrate by applying the base coating layer to the target substrate, applying the antifouling composition to the base coating layer prior to the base coating being fully cured, and curing the coating compositions. The respective coating compositions can be applied by any suitable methods including, but not limited to, by brush, by roller, by spraying, by dipping, etc. Curing can be accomplished by any suitable curing mechanism including, for example, moisture condensation.

The base coating and the antifouling coating can be applied to provide coating layers of a desired thickness. In one embodiment, for either the multi-layer or single coating layer systems, the base coating has a thickness of from 50 micrometers to about 500 micrometers; from about 100 micrometers to about 300 micrometers; even from about 150 micrometers to about 200 micrometers. In one embodiment, the antifouling coating (for the multi-layer system) can have a thickness of from 50 micrometers to about 400 micrometers; from about 100 micrometers to about 300 micrometers; even from about 150 micrometers to about 250 micrometers.

The coating systems can be employed in a variety of applications including on the surface of vessels (including but not limited to boats, yachts, motorboats, motor launches, ocean liners, tugboats, tankers, container ships and other cargo ships, submarines, and naval vessels of all types), pipes, shore and off-shore machinery, constructions and objects of all types such as piers, pilings, bridge substructures, water-power installations and structures, underwater oil well structures, nets and other aquatic culture installations, and buoys, etc.

EXAMPLES

Coated Sample Preparation

A stainless steel (304-3B) coupon of 0.037"×1"×6" is thoroughly cleaned by soaking in isopropanol and air drying before coating. An epoxy bottom coating is flow coated on one side of the cleaned stainless steel coupon and allowed to dry and cure at ambient conditions. After the epoxy bottom coat has cured for 24 hours, the silicone top coat is flow coated on top of the epoxy coat. The top coat is allowed to dry and cure at ambient conditions.

Adhesion Test

Adhesion is tested by scraping the coating with a 6"×¾" round headed wood tongue depressor. Sufficient force is applied on the tongue depressor to break or peel off the top coat from the epoxy bottom coat. Adhesion failure is assigned when the top coat is cleanly peeled off from the bottom coat. The top coat is considered to pass the adhesion test if there is only cohesion failure at the testing spot. The adhesion is ranked from 0-5 depending upon the level of cohesion failure, with 5 representing 100% cohesion failure occurred and 0 representing no cohesion failure (100% adhesion failure).

Adhesion after Water Soak

To estimate the long term adhesion performance of the coatings, selected coated samples are soaked in a 40° C. water bath for 1 month and adhesion is tested using the same adhesion test protocol described above.

Example 1

Synthesis of SiPEG 217 g of hydride terminated α,ω-(SiH)polydimethylsiloxane with a nominal structure of $^H MD_{10}M^H$, 36.8 g of vinyltrimethoxysilane, 420 g of toluene, and 0.13 g of chlorotris(triphenylphosphine)rhodium(I) is charged to a 3-neck round bottom flask equipped with $N_2$ inlet, condenser, and thermometer. The solution is mixed under $N_2$ blanket for 30 minutes before heating to 80.0 for 12 hours to afford a yellowish solution.

120 g of the solution is charged to another 3-neck round bottom flask equipped with an $N_2$ inlet, condenser, and thermometer. The reaction flask is further charged with 20.8 g polyethylene glycol monoallyl ether (eight ethylene oxide groups), 24 g toluene and 0.125 g solution of Karstedt's catalyst in isopropanol (1% Pt). The solution is mixed under $N_2$ for 30 minutes before being heated to 100° C. for 2 hours. The resulting solution contains 40% SiPEG with a chemical structure as follows:

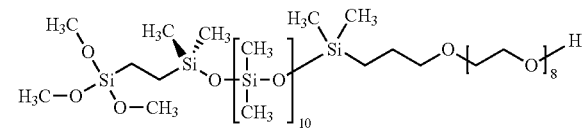

Example 2

Synthesis of Hybrid Adhesion Promoter 10.14 grams of Epilote 828 (from Momentive Specialty Chemicals), 42 grams of toluene, and 32 grams of SF1706 (curable aminosilicone that is dimethoxysilyl terminated and amine grafted) from Momentive Performance Materials is charged to a beaker and mixed at ambient for 4 hours before use.

Example 3

Preparation of Epoxy Coatings

Epoxdie-containing Epon 828 (from Momentive Specialty Chemicals) is cured with an amine (Epikure 3292-FX-60 from Momentive Specialty Chemicals) and, in some cases, the hybrid adhesion promoter of Example 2 at ambient conditions. The inputs are charged to a plastic container with formulas according to Table 1.

TABLE 1

|  | Example 3A | Example 3B |
|---|---|---|
| Epikure 3292-FX-60 | 21 | 12.6 |
| Epon 828 | 20 | 12.11 |
| Hybrid adhesion promoter (Example 2) | — | 0.396 |
| Xylene | 4 | 2.4 |

The mixing is accomplished using a Speed Mixer DAC 150 from FlackTech Inc. Once the coatings are cured, water contact angle increases from 70° of standard epoxy (Example 3A) to 920 when the hybrid adhesion promoter is included in Example 3B, indicating the existing of the silicone moiety on the coating surface.

Example 4

Preparation of Silicone RTV Compound

A silicone compound is mixed by co-extruding 50 parts of silicone polymer (a silanol terminated polydimethylsiloxane with a nominal viscosity of 3000 cps, CRTV 942, from Momentive Performance Materials) and 50 parts of calcium carbonate filler (Albacar 5970) at 80° C. Two RTV base compositions are then made by mixing the silicone compound with other silanol terminated polydimethylsiloxane using a Speed Mixer DAC150 from FlackTech Inc. (Table 2).

TABLE 2

|  | Example 4A | Example 4B |
|---|---|---|
| Silicone compound | 62 | 62 |
| CRTV942 | 27 | 17.35 |
| CRTV941 |  | 17.35 |
| 88680 | 7.7 | 7.7 |

Example 5

Preparation of Adhesion Promoters

Two adhesion promoters are made by mixing an epoxysilane (Silquest A-187 from Momentive performance Materials) and an aminosilane (Silquest A-1100 or Silquest A-1120 from Momentive Performance Materials) at ambient according to Table 3 for 24 hours before use.

TABLE 3

|  | Example 5A | Example 5B |
| --- | --- | --- |
| Silquest A-1100 | 5.8 | — |
| Silquest A-1120 | — | 4 |
| Silquest A-187 | 12.4 | 12.4 |

Example 6

Preparation of Silicone Coatings

Except as otherwise specified, silicone coatings are prepared using two methods. In Method A, a silicone RTV, RTV11 base (uncatalyzed) and SSG4400A from Momentive Performance Materials or the formulated compound of Example 4, is mixed with the SiPEG solution of Example 1, a commercial adhesion promoter silane, e.g., Silquest A-1100, 1200, A-1170, A-186 and A-187 (all from Momentive Performance Materials), an organic solvent, and a dibutyltin dilaurate (DBTDL) condensation catalyst. After each addition, the mixture is thoroughly mixed with a Speed Mixer. In cases when more than one adhesion promoter silane is used, the mixing is applied after each silane is added to prevent immediate reaction between the two silanes (e.g. epoxy silane and aminosilne).

Method B employs a two components approach. In one component (Part A), the silicone RTV is mixed with a crosslinking silane, such as ES-40 (partially condensed tetraethoxysilane) and n-propylsilicate, and in the other component (Part B), the adhesion promoter silane, organic solvent, and DBTDL is combined into a solution.

Example 7

To evaluate the impact of SiPEG to the adhesion of silicone RTV to epoxy coating, the silicone hydrogel coatings containing 0%, 5%, and 10% SiPEG with various adhesion promoter silanes are formulated according to Table 4 using Method A (Example 6). Epoxy of Example 3A is coated and dried for 1 day before the silicone hydrogel formulas are coated and cured at ambient conditions.

TABLE 4

|  | Ex. 7-1 | Ex. 7-2 | Ex. 7-3 | Ex. 7-4 | Ex. 7-5 | Ex. 7-6 | Ex. 7-7 | Ex. 7-8 | Ex. 7-9 | Ex. 7-10 | Ex. 7-11 | Ex. 7-12 |
| --- | --- | --- | --- | --- | --- | --- | --- | --- | --- | --- | --- | --- |
| SSG4400A | 18.0 | 19 | 20 | 18.0 | 19 | 20 | 18.0 | 19 | 20 | 18.0 | 19 | 20 |
| Ex. 1 (SiPEG solution) | 5.0 | 2.5 |  | 5.0 | 2.5 |  | 5.00 | 2.5 |  | 5.00 | 2.5 |  |
| Siliquest A-1100 | 0.13 | 0.13 | 0.13 |  |  |  |  |  |  |  |  |  |
| Siliquest A-186 |  |  |  |  |  |  |  |  |  |  |  |  |
| Siliquest A-187 | 0.29 | 0.29 | 0.29 |  |  |  |  |  |  | 0.43 | 0.43 | 0.43 |
| Example 5a |  |  |  | 0.43 | 0.43 | 0.43 |  |  |  |  |  |  |
| Example 5b |  |  |  |  |  |  | 0.43 | 0.43 | 0.43 |  |  |  |
| Xylene | 4.2 | 5.8 | 5.8 | 4.2 | 5.8 | 5.8 | 4.2 | 5.8 | 5.8 | 4.2 | 5.8 | 5.8 |
| DBTDL | 0.05 | 0.05 | 0.05 | 0.05 | 0.05 | 0.05 | 0.05 | 0.05 | 0.05 | 0.05 | 0.05 | 0.05 |
| Total | 27.67 | 27.77 | 26.27 | 27.68 | 27.78 | 26.28 | 27.68 | 27.78 | 26.28 | 27.68 | 27.28 | 26.28 |
| % SiPEG in dry film | 10 | 5 | 0 | 10 | 5 | 0 | 10 | 5 | 0 | 10 | 5 | 0 |
| % silane in dry film | 2.1 | 2.1 | 2.1 | 2.1 | 2.1 | 2.1 | 2.1 | 2.1 | 2.1 | 2.1 | 2.1 | 2.1 |
| Days to reach full adhesion | N* | 22 | 1 | N* | 6 | 1 | 22 | 1 | 1 | N* | N* | 1 |

As shown in Table 4, at a fixed amount of adhesion promoter, adhesion is delayed or never occurs in some cases with an increasing amount of SiPEG. Thus, SiPEG appears to have a profound adverse effect on adhesion of silicone RTV to epoxy coating.

Example 8

A number of silanes are incorporated to the SiPEG containing silicone hydrogel coatings and the adhesion after 24 hour curing and then immersed in 40° C. water bath for 30 days. The formulations are prepared according to Tables 5 and 6 using Method A (Example 6).

TABLE 5

|  | Ex. 8-1 | Ex. 8-2 | Ex. 8-3 | Ex. 8-4 | Ex. 8-5 | Ex. 8-6 | Ex. 8-7 | Ex. 8-8 | Ex. 8-9 |
| --- | --- | --- | --- | --- | --- | --- | --- | --- | --- |
| SSG4400A | 18.0 | 19 | 19 | 19 | 20 | 18.0 | 19 | 20 | 20 |
| Ex. 1 (SiPEG solution) | 5 | 2.5 | 2.5 | 2.5 |  | 5 | 2.5 |  |  |

TABLE 5-continued

| | Ex. 8-1 | Ex. 8-2 | Ex. 8-3 | Ex. 8-4 | Ex. 8-5 | Ex. 8-6 | Ex. 8-7 | Ex. 8-8 | Ex. 8-9 |
|---|---|---|---|---|---|---|---|---|---|
| Siliquest A-1100 | 0.29 | 0.29 | 0.33 | 0.13 | 0.13 | | | | |
| Siliquest A-186 | 0.77 | 0.77 | | | | | | | |
| Siliquest A-187 | | | 0.73 | 0.29 | 0.29 | | | | 0.43 |
| Example 5a | | | | | | 1.07 | | | |
| Example 5b | | | | | | | 1.07 | 0.43 | |
| Xylene | 2 | 4.5 | 5.9 | 5.8 | 5.8 | 4.4 | 5.9 | 5.8 | 5.8 |
| DBTDL | 0.045 | 0.052 | 0.05 | 0.05 | 0.05 | 0.05 | 0.05 | 0.05 | 0.05 |
| % SiPEG in dry film | 10 | 5 | 5 | 5 | 0 | 10 | 5 | 0 | 0 |
| % silane in dry film | 5.0 | 5.0 | 5.0 | 2.1 | 2.1 | 5.1 | 5.1 | 2.1 | 2.1 |
| Adhesion after 24 hr curing | 5 | 5 | 5 | 5 | 5 | 5 | 5 | 5 | 5 |
| Adhesion after 40° C. water bath | 5 | 5 | 5 | 5 | 5 | 5 | 5 | 5 | 5 |

TABLE 6

| | Sample 8-10 | Sample 8-11 | Sample 8-12 | Sample 8-13 | Sample 8-14 | Sample 8-15 | Sample 8-16 | Sample 8-17 | Sample 8-18 | Sample 8-19 |
|---|---|---|---|---|---|---|---|---|---|---|
| SSG4400A | 18 | 18 | 19 | 19 | 19 | 18 | 19 | 18 | 18 | 19 |
| Ex. 1 (SiPEG solution) | 5 | 5 | 2.5 | 2.5 | 2.5 | 5 | 2.5 | 5 | 5 | 2.5 |
| Silquest A-1170 | 1 | 0.4 | 1 | 0.4 | | | | | | |
| Silquest A-1100 | | | | | 0.52 | 0.52 | | | | |
| Silquest A-1120 | | | | | | | 0.52 | 0.52 | 0.43 | 0.43 |
| Xylene | 4 | 4 | 4 | 4 | 6.5 | 5 | 6.5 | 5 | 4.2 | 5.8 |
| DBTDL | | | | | 0.051 | 0.044 | 0.064 | 0.05 | 0.02 | 0.02 |
| % SiPEG in dry film | 10 | 10 | 5 | 5 | 5 | 10 | 5 | 10 | 10 | 5 |
| % silane in dry film | 5 | 2 | 5 | 2 | 2.5 | 2.5 | 2.5 | 2.5 | 2.1 | 2.1 |
| Adhesion after 24 hr curing | 5 | 5 | 5 | 5 | 5 | 5 | 5 | 5 | 5 | 5 |
| Adhesion after 40° C. water bath | 5 | 5 | 5 | 5 | 5 | 5 | 5 | 5 | 5 | 5 |

Epoxy of Example 3A is coated and dried for 1 day before the silicone hydrogel formulas are coated and cured under ambient conditions. The adhesion is measured after 24 hours curing. The cured samples are then immersed in a 40° C. water bath for 30 days and the adhesion is measured again.

Example 9

Synthesis of SiPEG-Me 217 g of hydride terminated α,ω-(SiH)polydimethylsiloxane with a nominal structure of $^HMD_{10}M^H$, 36.7 g of vinyltrimethoxysilane, 420.1 g of toluene, and 0.13 g of cholorotris(triphenylphosphine)rhodium(I) is charged to a 3-neck round bottom flask equipped with $N_2$ inlet, condenser, and thermometer. The solution is mixed under a $N_2$ blanket for 1 hour before heating to 80° C. for 12 hours to afford a yellowish solution.

300 g of the solution is charged to another 3-neck round bottom flask equipped with $N_2$ inlet, condenser, and thermometer. The reaction flask is further charged with 53.2 g allyloxypolyethylene glycol (7.5 EOs) methyl ether, 60 g toluene and 0.205 g solution of Karstedt's catalyst in isopropanol (1% Pt). The solution is mixed under $N_2$ for 30 minutes before heated to 100° C. for 2 hours. The resulting solution contains 40% SiPEG-Me.

Examples 10-13

In order to evaluate the adhesion improvement imparted by the hybrid adhesion promoter (Example 2), epoxy coating composition containing no hybrid adhesion promoter (Example 3A) and a composition that contains 1% hybrid adhesion promoter (Example 3B) are coated according to the coated sample preparation method. The silicone coating is prepared using Method B (Example 6). Two compositions of Part A are used (Example 4A and Example 4B). Part A is prepared by mixing ES-40 with Examples 4A and 4B, respectively. Part B is made by mixing 11.13 g SiPEG-Me (Example 9), 7.53 g xylene, 1.41 g Silquest A-1100 and 0.19 g dibutyltin dilaurate until homogeneous. The Coating compositions are shown in Table 7.

TABLE 7

|  | Example 10 | Example 11 | Example 12 | Example 13 |
|---|---|---|---|---|
| Epoxy coat | Example 3A | Example 3B | Example 3A | Example 3B |
| Silicone top coat PART A |  |  |  |  |
| Example 4A | 20 | 20 |  |  |
| Example 4B |  |  | 20 | 20 |
| ES-40 | 0.1037 | 0.1037 | 0.0798 | 0.0798 |
| PART B | 8.08 | 8.08 | 8.08 | 8.08 |
| 24 hr adhesion | 0 | 5 | 0 | 5 |

As shown in Table 7, incorporating 1% of a hybrid adhesion promoter in the epoxy base coat (Example 3B) greatly improved adhesion to the silicone coats.

Example 14

The adhesion improvement of the hybrid adhesion promoter is further investigated by coating silicone compositions containing various adhesion promoters or no adhesion promoter on the hybrid adhesion promoter-containing epoxy (Example 3B). The silicone compositions are prepared according to Table 8 using Method A.

TABLE 8

|  | Example 14-1 | Example 14-2 | Example 14-3 | Example 14-4 | Example 14-5 |
|---|---|---|---|---|---|
| SSG4400A | 19 | 19 | 18 | 18 | 18 |
| Example 1 (SiPEG solution) | 0 | 2.5 | 5 | 5 | 5 |
| n-propyl-silicate | 0.4 | 0.4 |  |  |  |
| Silquest A-1100 |  |  | 0.13 |  | 0.124 |
| Silquest A-1120 |  |  |  | 0.105 |  |
| Silquest A-186 |  |  |  |  | 0.302 |
| Silquest A-187 |  |  | 0.29 | 0.325 |  |
| xylene | 4.5 | 4.5 | 5 | 5 | 5 |
| 06082 (DBTDL) | 0.1 | 0.1 | 0.02 | 0.02 | 0.05 |
| % adhesion promoter | 0 | 0 | 2.06 | 2.10 | 2.09 |
| % SiPEG | 0 | 5 | 10 | 10 | 10 |
| Adhesion after 1 week curing | 5 | 5 | 5 | 5 | 5 |
| Adhesion after 40° C. bath | 5 | 5 | 5 | 5 | 5 |

Adhesion is measured after the silicone coatings are allowed to cure for a week and after the cured samples are soaked in a 40° C. water bath for 30 days.

Example 15

The hybrid adhesion promoter does not have to be premade before addition to the epoxy base coat formula. Improvement in adhesion can also be achieved by simply mixing the aminosilicone with epoxy base coat formula before coating. In this example the amine curing agent Epikure 3292-FX-60 is predissolved in xylene and then further mixed with Epon 828, from Momentive Specialty Chemicals, (Epoxy 15-1) and SF1706 (Epoxy 15-2). The formulas are coated on aluminum panels and allowed to cure at ambient temperature (about 25° C.) for 24 hours.

After the epoxy formulas are dried for a day, the top coat formulas are prepared and coated on top of the epoxy base coat. The top coat formulas comprise two components: Component A is made by mixing the silicone base of Example 4A with ES-40; and Component B is made by mixing the SiPEG-Me solution of Example 9, xylene, Silquest A-1100, and a dibutyltindilaurate (DBTDL) catalyst. Component A and Component B are mixed with a Speed Mixer and flow coated onto the epoxy coated panels. Table 9 illustrates the input charges. As illustrated in Table 9, the adhesion of the silicone top coats quickly developed on the epoxy base coat containing SF1706 (Examples 15-3 and 15-4). Examples 15-1 and 15-2, on the other hand, show without SF1706, the top coats do not develop adequate adhesion after 4 days even though these compositions employed a much higher levels of adhesion promoter (Silquest A-1100).

TABLE 9

|  | Example 15-1 | Example 15-2 | Example 15-3 | Example 15-4 |
|---|---|---|---|---|
| Epoxy base coat | Epoxy 15-1 | Epoxy 15-1 | Epoxy 15-2 | Epoxy 15-2 |
| Epikure 3292 solution | 12.60 | 12.60 | 12.60 | 12.60 |
| xylene | 4.20 | 4.20 | 4.20 | 4.20 |
| Epon 828 | 12 | 12 | 12.14 | 12.14 |
| SF1706 |  |  | 0.152 | 0.152 |
| Total | 28.80 | 28.80 | 29.09 | 29.09 |
| Top coat | Topcoat 15-1 | Topcoat 15-2 | Topcoat 15-3 | Topcoat 15-4 |
| Component A |  |  |  |  |
| Example 4A | 20 | 20 | 20 | 20 |
| ES-40 | 0.1 | 0.1 | 0.1 | 0.1 |
| Component B |  |  |  |  |
| Example 9 (SiPEG-Me solution) | 5.598 | 5.731 | 5.902 | 5.970 |
| xylene | 3.966 | 4.058 | 4.177 | 4.226 |
| Silquest A-1100 | 0.849 | 0.626 | 0.331 | 0.216 |
| DBTDL | 0.087 | 0.085 | 0.090 | 0.088 |
| 24 hr adhesion | 0 | 0 | 5 | 5 |
| 4 days adhesion | 0 | 0 | 5 | 5 |

Example 16

The use of a combination of aminosilane and organic epoxy in silicone top coat is also found to enhance the adhesion of water soaked coatings. In this example, a small amount of Epon 828 is incorporated into a silicone top coat formulation and adhesion is determined after the samples are immersed in a 40° C. water batch for 30 days. The epoxy base coats are prepared by mixing Epikure 3292-FX-60, Epon 828, and, optionally, SF1706 (Example 16-3). The base coat formulations are coated on aluminum panels and allowed to dry for 1 day. Table 9 shows the input charges. The top coats comprise two components: Component A comprises silicone base of Example 4A and optionally Epon 828 (Examples 16-2 and 16-3) dissolved in xylene; Component B comprises the SiPEG-Me solution of Example 9, Silquest A-1100, ES-40 and a dibutyltindilaurate catalyst mixed to homogeneous solution. Components A and B are mixed with a Speed Mixer and then coated onto the epoxy coated aluminum panels. The coatings are allowed to cure at ambient for a day, and the adhesion is tested. The samples are then immersed in a 40° C. water bath for 30 days before another adhesion test is carried out. Table 10 illustrates that the addition of SF1706 improves the initial adhesion of the top coat (Example 16-3). The addition of Epon 828 in the top coats improves the water soak adhesion (Examples 16-2 and 16-3) even if the initial adhesion did not develop in 24 hours (Example 16-2).

TABLE 10

|  | Example 16-1 | Example 16-2 | Example 16-3 |
| --- | --- | --- | --- |
| Epoxy base coat | Epoxy 16-1 | Epoxy 16-1 | Epoxy 16-2 |
| Epikure 3292 -FX-60 | 10.5 | 10.5 | 12.6 |
| Epon 828 | 10.05 | 10.05 | 12.11 |
| xylene | 4 | 4 | 4 |
| SF1706 |  |  | 0.2 |
| Top coat | Topcoat 16-1 | Topcoat 16-2 | Topcoat 16-2 |
| Component A |  |  |  |
| Example 4A | 20 | 19.08 | 19.08 |
| Epon 828 |  | 0.92 | 0.92 |
| xylene | 3.514 | 4.524 | 4.524 |
| Component B |  |  |  |
| Example 9 (SiPEG-Me solution) | 5.794 | 5.794 | 5.794 |
| Silquest A-1100 | 0.605 | 0.605 | 0.605 |
| ES-40 | 0.119 | 0.119 | 0.119 |
| DBTDL | 0.082 | 0.082 | 0.082 |
| 24 hr adhesion | 0 | 0 | 5 |
| adhesion after 30 days in 40 C. water | 0 | 5 | 5 |

Example 17

Ocean Test

Antifouling performance testing is carried out by immersing coated samples in Indian Ocean, Tuticorin, India, conducted by Sacred Heart Marine Centre. Table 11 shows the charges for each of the top coat and base coat formulas. At ambient conditions, Epikure 3292-FX-60 is mixed in xylene until dissolved followed by further mixing with Epon 828, and if necessary SF1706 or the hybrid adhesion promoter. Steel panels 3" by 6" are coated with epoxy base coat formulas using a brush and dried at ambient conditions for a day.

Silicone top coats are prepared using two components: Component A comprises (RTV 11 from Momentive Performance Materials, Inc.), or a mixture of silicone base of Example 4A and ES-40, made by mixing the two components with a Speed Mixer. Component B is made by mixing a SiPEG-Me solution of Example 9, xylene, Silquest A-1100, Silquest A-186 (in Examples 17-1 and 17-2), and a dibutyltindilaurate catalyst. After components A and B are mixed with a Speed Mixer, the respective silicone top coat formula is then coated on top of the partially cured epoxy coat according to Table 11. After curing for at least 7 days, the coated panels are immersed in the ocean and static immersion test is conducted for 2 months.

TABLE 11

|  | Example 17-1 | Example 17-2 | Example 17-3 | Example 17-4 | Example 17-5 |
| --- | --- | --- | --- | --- | --- |
| Epoxy base coat | Epoxy 17-1 | Epoxy 17-2 | Epoxy 17-3 | Epoxy 17-4 | Epoxy 17-5 |
| Epikure 3292-FX-60 | 25.20 | 25.20 | 25.20 | 15.17 | 16.80 |
| xylene | 8.40 | 8.40 | 8.40 | 5.06 | 5.60 |
| Example 2 | 0.83 |  |  |  |  |
| SF1706 |  | 0.317 | 0.317 | 0.192 |  |
| Epon 828 | 24.2 | 24.28 | 24.28 | 14.57 | 16 |
| Top Coat Component A |  |  |  |  |  |
| Example 4A | 20 | 24 | 24 | 48 |  |
| ES-40 | 0.1 | 0.12 | 0.12 | 0.24 |  |
| RTV11 |  |  |  |  |  |
| Component B | Topcoat 17-1 | Topcoat 17-2 | Topcoat 17-3 | Topcoat 17-4 | Topcoat 17-5 |
| Example 9 (SiPEG-Me solution) | 5.720 | 6.992 | 7.163 | 6.374 | 0.000 |
| xylene | 4.213 | 4.929 | 5.070 | 12.934 | 12.203 |
| Silquest A-1100 | 0.138 | 0.166 | 0.259 | 0.485 | 0.344 |
| Silquest A-186 | 0.340 | 0.419 |  |  |  |
| DBTDL | 0.090 | 0.093 | 0.108 | 0.208 | 0.193 |

FIG. 1 shows pictures of the sample panels after 2 months in Indian Ocean. The panel of Example 17-5 coated with top coat of traditional silicone RTV (RTV11) exhibits fouling in the form of algae and barnacles attachment to the panel. The panels of Examples 17-1 through 17-4 coated with hydrogel top coats in accordance with aspects and embodiments of the present invention, however, remain free of fouling.

Example 18

Silicone hydrogel top coats can also be used in a three-layer coating system, such as: anticorrosion epoxy coat/tie coat/top coat. This example illustrates the usefulness of the disclosed silicone hydrogel top coat in a tie coat-containing antifouling system.

A substrate panel is coated with an anticorrosion epoxy primer InterProtect® 2000E (from International Paint) and a then tie coat layer Intersleek®731 (from International Paint) according to the manufacturer's recommended procedure of mixing 3 parts of component A and 1 part of component B of InterProtect® 2000E mixed and coating with a brush. A one to one ratio of component A and component B of Intersleek®731 are mixed and coated, over the anticorrosion coating layer using a brush. Each coating is allowed to dry and cure at ambient conditions for a day before another coating is applied. The silicone hydrogel top coat is applied on top of Intersleek®731 and adhesion was test was conducted after the top coat is allowed to cure at ambient conditions for a day.

The top coat formulation is made by preparing components A and B separately. In component A, 0.45 g Epon 828 (from Momentive Specialty Chemicals) is dissolved in 5.2 g of xylene and then mixed with 19.06 g a silicone base compound of Example 4A using a Speed Mixer. In component B, 5.474 g a SiPEG-Me solution of Example 9, 0.164 g Silquest A-1100, 0.15 g ES-40, and 0.097 g dibutyltindilaulate are mixed until homogeneous. Components A and B are mixed with Speed Mixer before applying the composition with a brush onto the partially cured tie coat layer After allowing for 24 hours curing, the adhesion is tested and found strong bonding between silicone hydrogel top coat and Intersleek® 731 tie coat.

Example 19

Synthesis of SiPEG-Me 217 g of hydride-terminated α,ω-(SiH)polydimethylsiloxane with a nominal structure of $^HMD_{12}M^H$, 36.9 grams of vinyltrimethoxysilane, 45.3 grams of toluene, and 0.05 grams of cholorotris(triphenylphosphine)rhodium(I) was charged to a 3-neck round bottom flask equipped with $N_2$ inlet, condenser, and thermometer. The solution was mixed under $N_2$ blanket for 30 minutes before heating to 80° C. for 8 hours to afford a yellowish solution.

Of the solution, 259 grams was charged to another 3-neck round bottom flask equipped with $N_2$ inlet, condenser, and thermometer. The reaction flask was further charged with 103.4 grams allyloxypolyethylene glycol (7.5% ethylene oxide) methyl ether, 283.5 grams toluene and 0.082 grams solution of Karstedt's catalyst in isopropanol (1% Pt). The solution was mixed under $N_2$ for 30 minutes before heated to 100° C. for 3 hours. The resulting solution contains 50% SiPEG-Me.

Example 20

Synthesis of Adhesion Promoter Adduct 1

34 grams of Epon 828 (from Momentive Specialty Chemicals), 10.5 grams of Silwet A-1100 (form Momentive Performance Materials) and 68 grams xylene was charged into a condenser and nitrogen inlet equipped a 3 neck flask. The mixture was mixed under nitrogen at ambient condition for 30 minutes and then heated to 80° C. The solution was allowed to mix at 80° C. for a total of 6 hours to afford a clear solution. The solution was allowed to cool to room temperature to be formulated into room temperature curable antifouling compounds.

Example 21

Synthesis of Adhesion Promoter Adduct 2

34 grams Epon 828 (from Momentive Specialty Chemicals), 47 grams Silwet A-1100 (form Momentive Performance Materials) and 68 grams xylene was charged into a condenser and nitrogen inlet equipped 3 neck flask. The mixture was mixed under nitrogen at ambient condition for 30 minutes and then heated to 80° C. The solution was allowed to mix at 80° C. for a total of 6 hours to afford a clear solution. The solution was allowed to cool to room temperature to be formulated into room temperature curable antifouling compounds.

Example 22

Preparation of Epoxy Bottom Coat

Epoxdie-containing Epon 828 (from Momentive Specialty Chemicals) was mixed with an amine crosslinker (Epikure 3292-FX-60 from Momentive Specialty Chemicals) and, in Example 22b, SF1706 (a curable aminosilicone from Momentive Performance Materials) and xylene according to Table 12. The mixing was accomplished using Speed Mixer DAC150 from FlackTech Inc. The mixtures were allowed to sit at ambient conditions for 20-40 minutes before coating on substrate.

TABLE 12

|  | Example 22a | Example 22b |
| --- | --- | --- |
| Epikure 3292-FX-60 | 21.00 | 17.50 |
| Epon 828 | 20.00 | 16.83 |
| xylene |  | 5.55 |
| SF1706 |  | 0.28 |
| total | 41.00 | 40.16 |

Example 23

Preparation of Silicone Hydrogel Top Coat 1

To a plastic cup designated to be used for speed mixer was charged 16.95 grams of RTV157 (a room temperature curable acetoxy RTV from Momentive Performance Materials), 3.96 grams of SiPEG-Me solution of Example 19, and 7.39 grams of xylene. The mixing was accomplished using Speed Mixer DAC150 from FlackTech Inc.

Example 24

Evaluation of Adhesion Imparted by SF1706

Aluminum coupons of 0.037"×1"×6" were thoroughly cleaned by soaking in isopropanol and air dry before coating. Each epoxy bottom coat of Examples 22a and 22b was flow coated on one side of a cleaned stainless steel coupons, respectively, and allowed to dry and cure at ambient conditions. After the epoxy bottom coat had cured for at least 24 hours, the silicone top coat 1 of Example 23 was coated with a brush on the top of the epoxy coats. The top coat was allowed to dry and cure at ambient conditions. Thus, there are two replicates of each combination of epoxy bottom coats and the top coat.

While the adhesion between top coat 1 and the bottom coat of Example 22b, where SF1706 was employed, developed within 24 hours, there was no adhesion between top coat 1 and bottom coat of Example 22a even after 3 days curing.

Example 25

Preparation of Silicone Hydrogel Top Coat 2a, 2b, 2c

The same preparation of Example 23 was employed according to the respective receipts shown in Table 13.

TABLE 13

|  | Example 25a | Example 25b | Example 25c |
| --- | --- | --- | --- |
| RTV157 | 16.95 | 16.95 | 16.95 |
| SiPEG-Me (Example 19) | 3.80 | 3.90 | 3.84 |
| Adduct 1 (Example 20) |  | 1.20 |  |
| Adduct 2 (Example 21) |  |  | 0.36 |
| xylene | 6.00 | 6.00 | 6.21 |
| Total | 26.75 | 28.05 | 27.35 |

Example 26

Evaluation of Adhesion Imparted by Adducts

Six aluminum coupons of 0.037"×1"×6" were thoroughly cleaned by soaking in isopropanol and air dry before coating. An epoxy bottom coat of Examples 22a, where SF1706 is not employed, was flow coated on one side of cleaned stainless steel coupons and allowed to dry and cure at ambient conditions. After the epoxy bottom coat had cured for at least 24 hours, each of the silicone top coats of Example 25 was separately coated with a brush on two of epoxy coated samples. The top coat was directly applied to the top of the epoxy coat. The top coat was allowed to dry and cure at 28° C. and 60% relative humidity.

Similar to that found in the situation of top coat 1 and Example 22a, with the bottom coat of Example 24, in the absence of SF1706, the top coat 25a and the bottom coat 22a again exhibited no adhesion after 5 days curing. The top coats 25b and 25c, however, which were formulated with small amounts of adducts, exhibited strong adhesion after 2 days curing.

Example 27

Evaluation of Adhesion Imparted by Adducts and SF1706

Six aluminum coupons of 0.037"×1"×6" were thoroughly cleaned by soaking in isopropanol and air dry before coating. An epoxy bottom coat of Examples 22b, where SF1706 is employed, was flow coated on one side of cleaned stainless steel coupons and allowed to dry and cure at ambient conditions. After the epoxy bottom coat had cured for at least 24 hours, each of the silicone top coats of Example 25 was separately coated with a brush on two of the epoxy coated samples. The top coat was directly applied to the top of the epoxy coat. The top coat was allowed to dry and cure at 28° C. and 60% relative humidity. All the top coats and the SF1706-containing bottom coat developed strong adhesion within 2 days of curing.

While the invention has been described with reference to various exemplary embodiments, it will be appreciated that modifications may occur to those killed in the art, and the present application is intended to cover such modifications and inventions as fall within the spirit of the invention.

What is claimed is:

1. An antifouling coating system comprising:
   (a) a base coating composition comprising a base coating material and optionally a first adhesion promoter; and
   (b) an antifouling coating composition comprising
      (i) a silane of the formula:

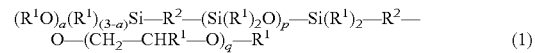

where a is independently 1-3; $R^1$ is independently chosen from a H or a $C_1$-$C_{10}$ alkyl radical; $R^2$ is independently chosen from a $C_2$-$C_{10}$ alkylene; p is 1-100; q is 1-50;

(ii) a functionalized polymer of the formula:

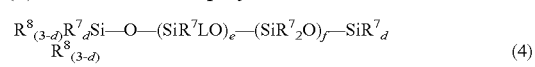

wherein L is $—(SiR^7_2O)_n—SiR^7_dR^8_{(3-d)}$; $R^7$ is independently chosen from a C1 to C10 alkyl, or a substituted or un-substituted phenyl group; $R^8$ is independently chosen from an alkoxy, an acetoxy, or a ketoxime radical; d is independently 0-2; e is 1-10,000; and f is 10-100,000;

(iii) optionally a second adhesion promoter; (iv) optionally an inorganic filler; and (v) optionally a silane cross linker, and optionally a condensation catalyst.

2. The antifouling coating system of claim 1, wherein $R^8$ is an acetoxy group.

3. The antifouling coating system of claim 1, wherein $R^8$ is an alkoxy group.

4. The antifouling coating system of claim 1, wherein $R^8$ is a ketoxime radical.

5. The antifouling coating system of claim 1, wherein the functionalized polymer is alpha, gamma-bis(methyl diacetoxysilyl) polydimethylsiloxane.

6. The antifouling system of claim 1, wherein $R^1$ is methyl.

7. The antifouling system of claim 1, wherein the silane is:

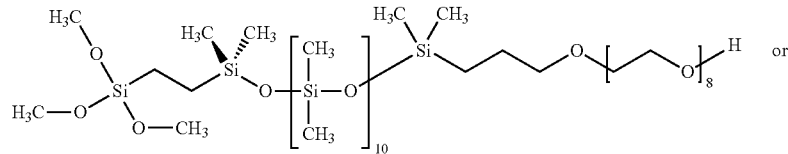

or

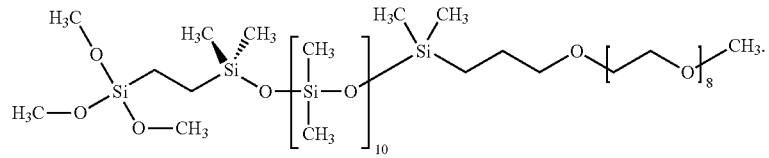

8. The antifouling system of claim 1, wherein the antifouling coating composition comprises the functionalized polymer (ii) in an amount of from about 10 weight percent to about 99 weight percent.

9. The antifouling system of claim 1, wherein the antifouling coating composition comprises the silane (i) in an amount of from about 0.1 weight percent to about 40 weight percent.

10. The antifouling system of claim 1, wherein the base coating composition comprises an anticorrosive coating material.

11. The antifouling system of claim 1, wherein the base coating composition comprises an epoxy resin composition.

12. The antifouling system of claim 1, wherein the first adhesion promoter comprises an epoxy modified adhesion promoter.

13. The antifouling system of claim 12, wherein the epoxy modified adhesion promoter comprises at least one molecule having the chemical formula:

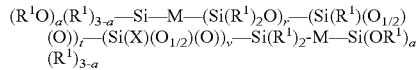

where $R^1$ is independently H or an alkyl radical, M is independently $R^2$ or oxygen; r is 0-1000; t is 1 to 20; v is 0 to 20; X is $-R^2-(N(R^1)_{1-b}(Y)_b-R^2)_c-N(R^1)_{2-b}(Y)_b$; a is 1-3; b is 0-2; c is 0-5; Y is independently $R^1$ or an organic radical with an epoxide at one terminal; and $R^2$ is independently a $C_2$-$C_{10}$alkylene, with the proviso that at least one Y is an organic radical with an epoxide at one terminal.

14. The antifouling system of claim 13, wherein the epoxy modified adhesion promoter is of the formula:

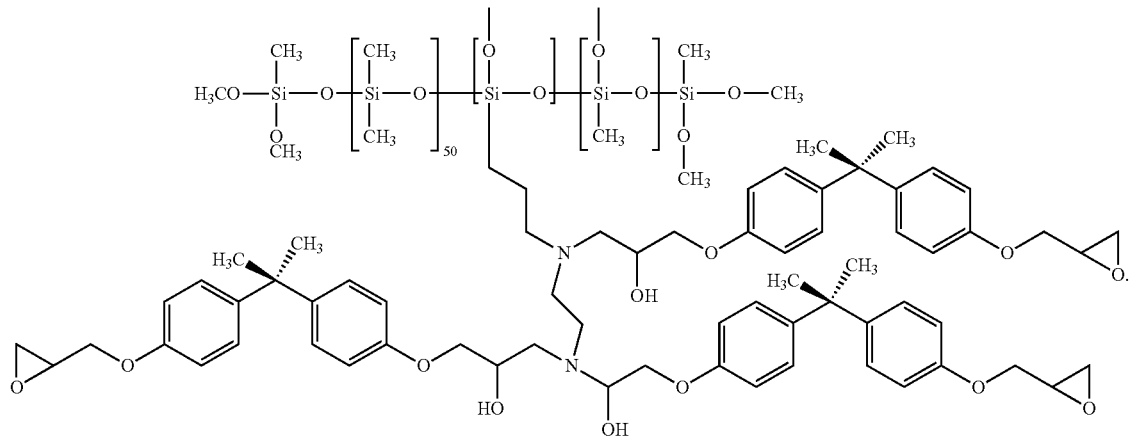

15. The antifouling system of claim 12, wherein the epoxy modified adhesion promoter is present in an amount of from about 0.1 weight percent to about 20 weight percent based on the total weight of the cured base coating composition.

16. An article comprising the coating system of claim 1, the article comprising a base coat layer formed from the base coating composition disposed on a surface of the article, and an antifouling coating layer disposed on the base coat layer.

17. The article of claim 16, wherein the coating system is substantially free of a tie coat layer disposed between the based coat layer and the antifouling coating layer.

18. The article of claim 16, wherein the surface of the article comprises a metal, fiberglass, wood, fiber reinforced plastic, concrete, or a combination of two or more thereof.

19. A method of providing an article with a surface exhibiting an antifouling property, the method comprising applying the coating system of claim 1 to an article.

20. The method of claim 19 comprising applying the base coating composition to a surface of the article to form a base coating layer; and applying the antifouling coating composition directly onto the base coating layer to form an antifouling coating layer overlying the base coating layer.

21. An antifouling coating system comprising:
(a) a base coating composition comprising a base coating material and optionally, a first adhesion promoter;
(b) an antifouling coating composition comprising (i) a silane of the formula:

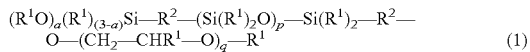

where a is 1-3; $R^1$ is independently chosen from H or alkyl radical from $C_1$-$C_{10}$; $R^2$ is a $C_2$-$C_{10}$alkylene; p is 1-100; q is 1-50; (ii) a functionalized polymer; (iii) a second adhesion promoter of the formula U—Q—$R^{11}$—$SiR^9_g R10_{(3-g)}$ wherein Q is $-CH_2CH(OH)-O-$ or $-CH_2CH(OH)CH_2-NR^{12}-$; U is:
$-O-(C_6H_hR^9_{(4-h)}-CR^{13}-C_6H_hR^9_{(4-h)}-O-CH_2CH(OH)CH_2-O)_i-C_6H_hR^9_{(4-h)}-CR^{13}-C_6H_hR^9_{(4-h)}-O-Z$;

where $R^9$ is independently chosen from a C1 to C10 alkyl or a substituted or un-substituted phenyl group; $R^{10}$ is independently chosen from an alkoxy, an acetoxy, or a ketoxime radical; $R^{11}$ is a C1 to C4 alkylene g is 0-2; h is 0-4; where $R^{12}$ is H or $-CH_2CH(OH)CH_2-U-$; $R^{13}$ is independently H or alkyl; i is 0-100; and Z is H, Q-$SiR^9_h R^{10}_{(3-h)}$, or

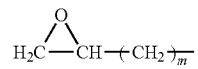

where m is 1-20; (iv) optionally an inorganic filler; and (v) optionally a silane cross linker, and optionally a condensation catalyst.

22. The antifouling coating system of claim 21, wherein the second adhesion promoter is chosen from a compound of the formula:

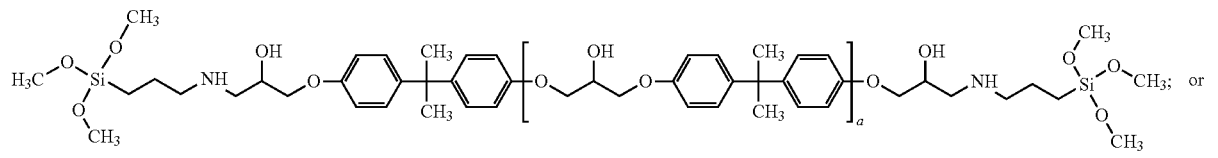

(5a)

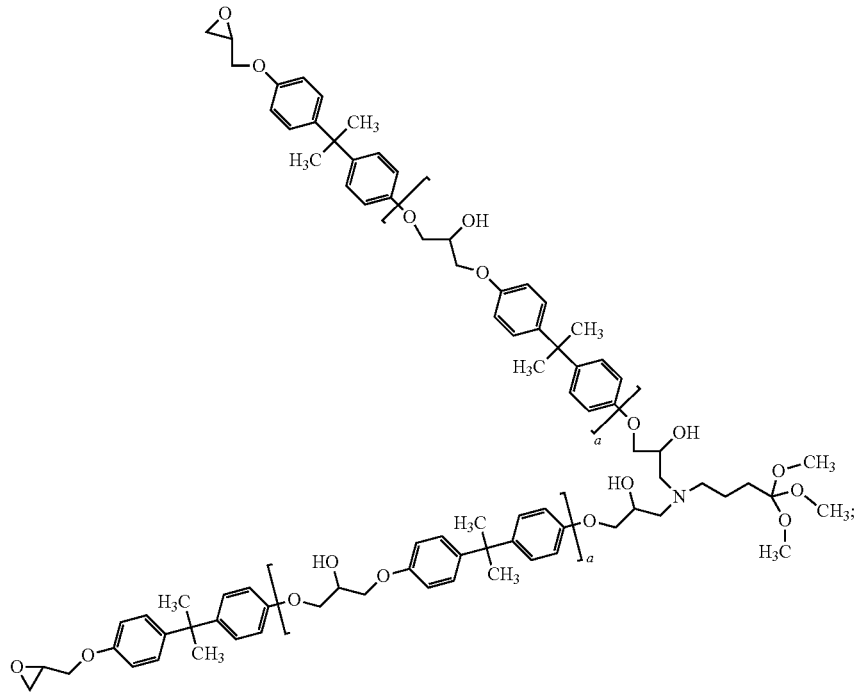

(5b)

or a combination thereof.

23. The antifouling coating system of claim 21, wherein the functionalized polymer is chosen from a hydroxyl functional, an acetoxy functional, an alkoxy functional, and/or a ketoxime functional polymer.

24. The antifouling system of claim 23, wherein the hydroxyl functional polymer is of the formula:

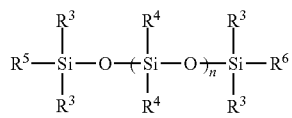

where n is 1-100,000; $R^3$ is individually chosen from OH, $OR^1$, or an alkyl; $R^1$ is independently H or an alkyl radical; $R^4$ is individually chosen from an alkyl, an aryl fluoro alkyl, a fluoro aryl, an alkyl aryl or $R^5$; and $R^5$ and $R^6$ are individually OH or $OR^1$, with at least one of $R^3$, $R^4$, $R^5$, $R^6$, or a combination thereof being OH.

25. The antifouling system of claim 23, wherein the functionalized polymer is chosen from a compound of the formula:

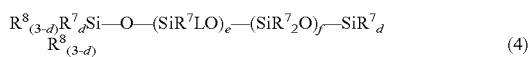

(4)

wherein L is —$(SiR^7{}_2O)_f SiR^7{}_d R^8{}_{(3-d)}$; $R^7$ is independently chosen from a C1-C10 alkyl, or a substituted or un-substituted phenyl group; $R^8$ is independently chosen from an alkoxy, an acetoxy, or a ketoxime radical; d is 0-2; e is 1-10,000; and f is 10-100,000.

26. The antifouling coating system of claim 25, wherein the functionalized polymer is α, ω-bis(methyl diacetoxysilyl) polydimethylsiloxane.

27. The antifouling coating system of claim 21, wherein the first adhesion promoter is a compound of the formula:

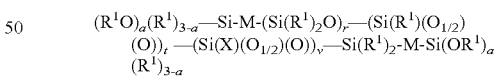

where $R^1$ is independently chosen from H or an alkyl radical; M is independently chosen from $R^2$ or oxygen; r is 0-1000; t is 1 to 20; v is 0 to 20; X is —$R^2$—$(N(R^1)_{1-b}(Y)_b$—$R^2)_c$ —$N(R^1)_{2-b}(Y)_b$; a is 1-3; c is 0-5; b is 0-2; Y is independently chosen from $R^1$ or an organic radical with an epoxide at one terminal; and $R^2$ is a $C_2$-$C_{10}$ alkylene.

28. The antifouling coating system of claim 27, wherein the first adhesion promoter has at least one Y group and is an organic radical with an epoxide at one terminal.

* * * * *